(12) United States Patent
Kidachi

(10) Patent No.: US 10,327,396 B2
(45) Date of Patent: Jun. 25, 2019

(54) EMITTER, AND DRIP IRRIGATION TUBE

(71) Applicant: Enplas Corporation, Saitama (JP)

(72) Inventor: Masahiro Kidachi, Saitama (JP)

(73) Assignee: ENPLAS CORPORATION, Saitama (JP)

(*) Notice: Subject to any disclaimer, the term of this patent is extended or adjusted under 35 U.S.C. 154(b) by 55 days.

(21) Appl. No.: 15/106,950

(22) PCT Filed: Nov. 27, 2014

(86) PCT No.: PCT/JP2014/081312
§ 371 (c)(1),
(2) Date: Jun. 21, 2016

(87) PCT Pub. No.: WO2015/098412
PCT Pub. Date: Jul. 2, 2015

(65) Prior Publication Data
US 2017/0035005 A1  Feb. 9, 2017

(30) Foreign Application Priority Data

Dec. 27, 2013 (JP) .................................. 2013-272393

(51) Int. Cl.
*A01G 25/02* (2006.01)
*A01G 25/16* (2006.01)

(52) U.S. Cl.
CPC ........... *A01G 25/023* (2013.01); *A01G 25/16* (2013.01); *A01G 25/165* (2013.01); *Y02A 40/237* (2018.01)

(58) Field of Classification Search
CPC .... A01G 25/02; A01G 25/023; A01G 25/165; B05B 12/008
(Continued)

(56) References Cited

U.S. PATENT DOCUMENTS 4,210,287 A * 7/1980 Mehoudar ............ A01G 25/023
239/542
5,183,208 A 2/1993 Cohen
(Continued)

FOREIGN PATENT DOCUMENTS

EP  0467386 A2  1/1992
JP  4-211311 A  8/1992
(Continued)

OTHER PUBLICATIONS

Extended European Search Report for 14874939.3 dated Jul. 21, 2017.
(Continued)

*Primary Examiner* — Steven J Ganey
*Assistant Examiner* — Joseph A Greenlund
(74) *Attorney, Agent, or Firm* — Brundidge & Stanger, P.C.

(57) ABSTRACT

This emitter (120) includes a channel which spans to a recessed section (252), from an intake path (221) for receiving an irrigation liquid inside a tube. The channel includes an aperture (243) which is closed by a lid (244) disposed so as to not be in contact with a film (300). A groove is formed at the periphery of the aperture (243). When the film (300) is pressed as a result of the pressure of the irrigation liquid inside the tube, and the lid (244) closes the aperture (243), the flow rate of the irrigation liquid inside the emitter (120) is controlled so as to be the amount capable of passing through the groove. This flow-rate control continues until the pressure difference in the channel between a side upstream with respect to the lid (244) and a side downstream with respect to the lid (244) has been sufficiently reduced.

11 Claims, 21 Drawing Sheets

(58) Field of Classification Search
USPC .......................................................... 239/542
See application file for complete search history.

(56) References Cited

U.S. PATENT DOCUMENTS

| | | | | |
|---|---|---|---|---|
| 6,027,048 | A * | 2/2000 | Mehoudar | A01G 25/023 138/42 |
| 6,302,338 | B1 * | 10/2001 | Cohen | A01G 25/023 239/542 |
| 6,945,476 | B2 * | 9/2005 | Giuffre | A01G 25/023 239/542 |
| 7,648,085 | B2 * | 1/2010 | Mavrakis | A01G 25/023 239/542 |
| 8,511,585 | B2 * | 8/2013 | Keren | A01G 25/023 239/542 |
| 8,998,113 | B2 * | 4/2015 | Keren | A01G 25/023 239/542 |
| 9,345,205 | B2 * | 5/2016 | Kidachi | A01G 25/023 |
| 9,743,595 | B2 * | 8/2017 | Mavrakis | A01G 25/023 |
| 9,943,045 | B2 * | 4/2018 | Kidachi | A01G 25/023 |
| 2002/0070297 | A1 * | 6/2002 | Bolinis | A01G 25/023 239/542 |
| 2005/0284966 | A1 * | 12/2005 | DeFrank | A01G 25/023 239/542 |
| 2010/0155508 | A1 * | 6/2010 | Keren | A01G 25/023 239/542 |
| 2012/0160926 | A1 * | 6/2012 | Lutzki | A01G 25/023 239/11 |
| 2016/0286742 | A1 * | 10/2016 | Kidachi | A01G 25/023 |
| 2016/0295816 | A1 * | 10/2016 | Kidachi | A01G 25/023 |
| 2016/0309669 | A1 * | 10/2016 | Kidachi | A01G 25/02 |
| 2016/0330917 | A1 * | 11/2016 | Kidachi | A01G 25/023 |
| 2017/0035005 | A1 * | 2/2017 | Kidachi | A01G 25/023 |

FOREIGN PATENT DOCUMENTS

| | | |
|---|---|---|
| JP | 5-276842 A | 10/1993 |
| JP | 2010-046094 A | 3/2010 |
| WO | 99/33571 A1 | 7/1999 |

OTHER PUBLICATIONS

International Search Report from International Application No. PCT/JP2014/081312 dated Mar. 3, 2015.

* cited by examiner

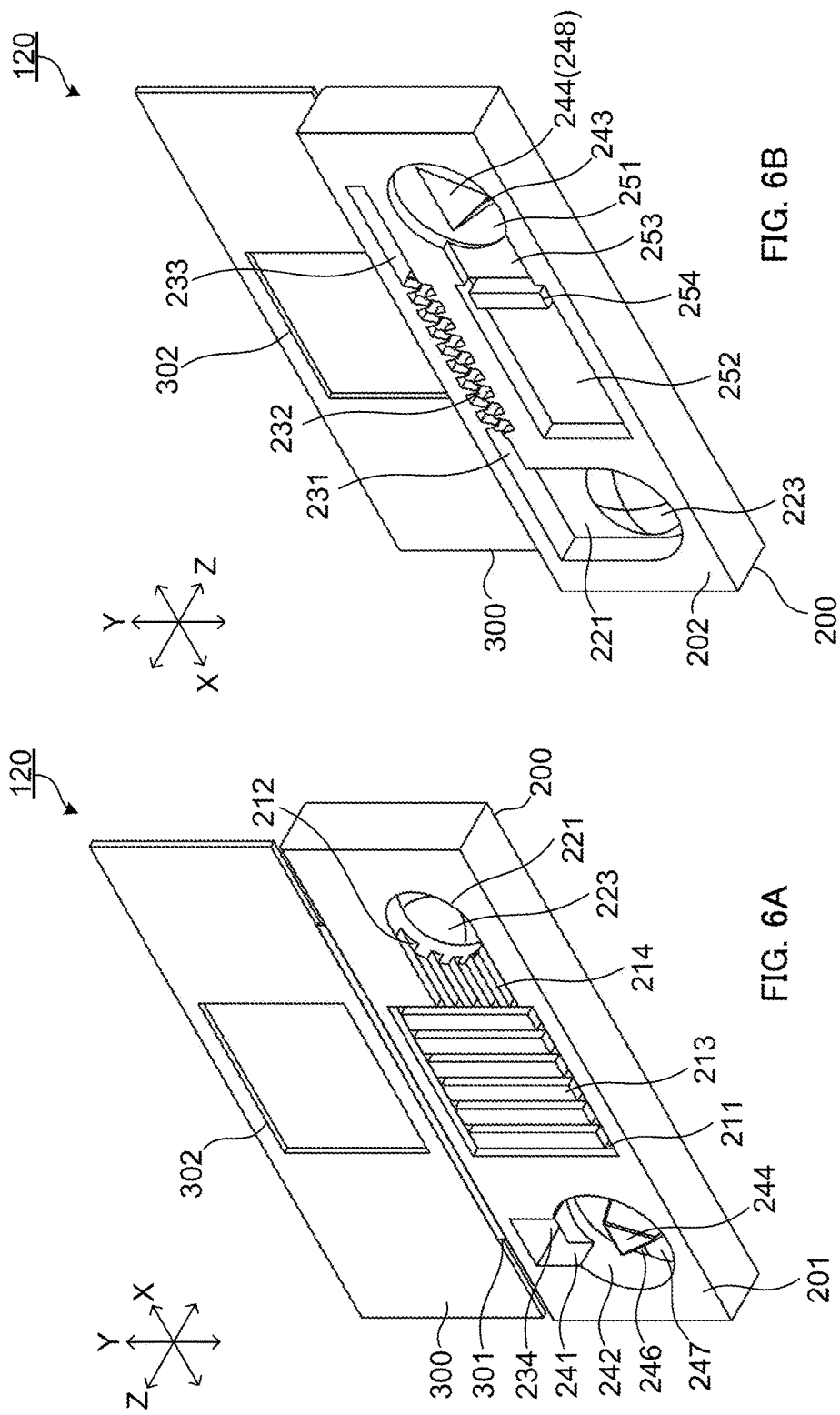

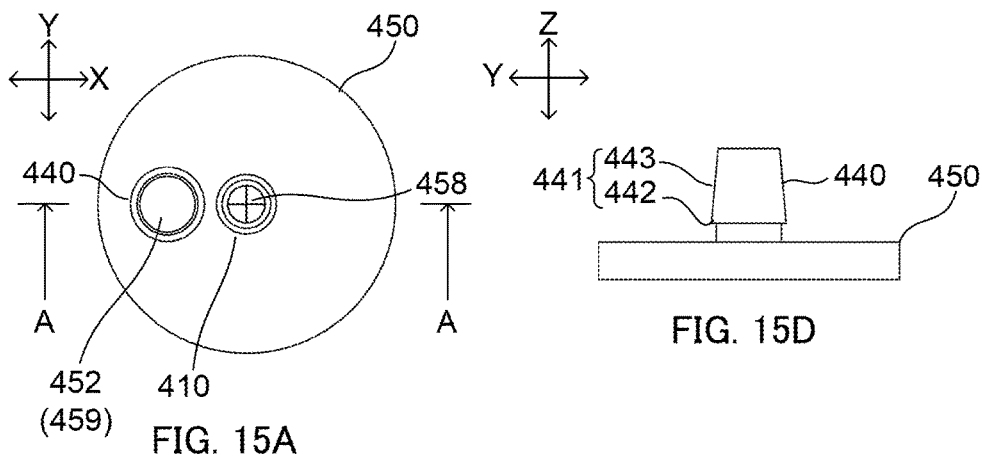
FIG. 15A
FIG. 15D
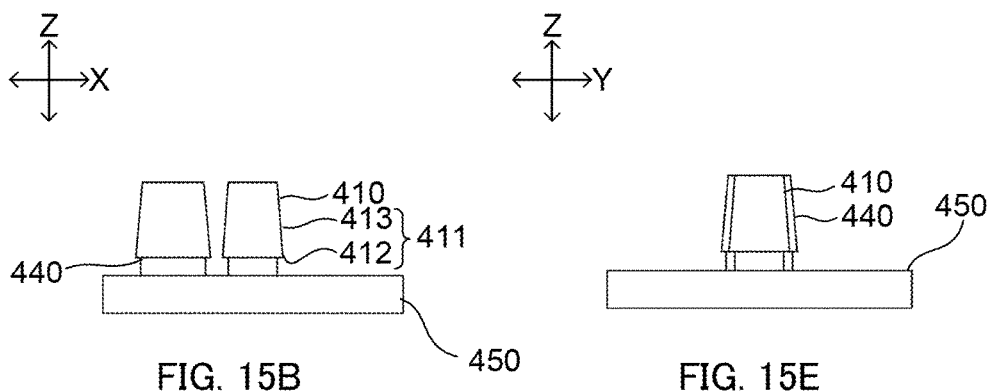
FIG. 15B
FIG. 15E
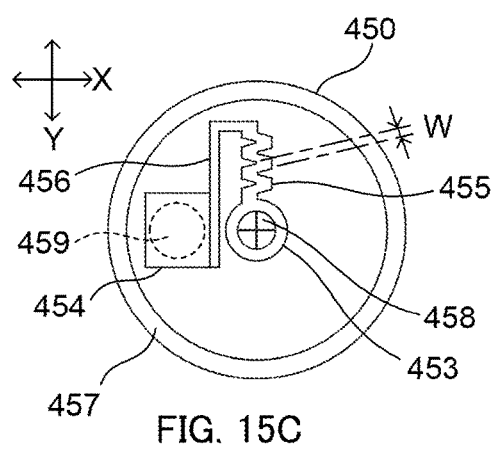
FIG. 15C

EMITTER, AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction channel for allowing the irrigation liquid having entered the emitter from the internal space of the tube toward the through hole of the tube while reducing the pressure of the liquid, and a diaphragm part configured to change the volume of a portion of the channel where the irrigation liquid having reduced pressure flows in accordance with the pressure of the liquid in the tube. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the irrigation liquid in the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Generally, in a trickle irrigation tube, hundreds of emitters are disposed in one tube in some cases. In a long trickle irrigation tube, the supply pressure of irrigation liquid to the tube is required to be increased, and consequently the discharge rate of the irrigation liquid of the emitter may not be stable. In view of this, control of the discharge rate of the irrigation liquid of the emitter in accordance with the pressure of the irrigation liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost. In addition, another object of the present invention is to provide a trickle irrigation tube having the emitter.

Solution to Problem

The present invention provides an emitter for quantitatively discharging irrigation liquid in a tube to outside of the tube, the tube being configured for allowing the irrigation liquid to flow therethrough, the emitter being configured to be disposed on the tube and including: an intake part for receiving the irrigation liquid in the tube; a pressure reduction channel for allowing the irrigation liquid received from the intake part to flow therethrough while reducing a pressure of the irrigation liquid; a flow rate controlling part for controlling a flow rate of the irrigation liquid supplied from the pressure reduction channel in accordance with a pressure of the irrigation liquid in the tube or in the intake part; and a discharge part which is supplied with the irrigation liquid which has a flow rate controlled by the flow rate controlling part and is to be discharged to the outside of the tube; the flow rate controlling part including: a valve element for opening and closing a channel of the irrigation liquid, a valve seat on which the valve element sits when the valve element closes the channel of the irrigation liquid, a film for pushing the valve element toward the valve seat by being bent under the pressure of the irrigation liquid in the tube or in the intake part such that the valve element sits on the valve seat, and a groove formed on a surface of the valve seat, and configured to communicate between the channel of the irrigation liquid on an upstream side of the valve seat and the channel of the irrigation liquid on a downstream side of the valve seat when the valve element sits on the valve seat. The film pushes the valve element such that the valve element sits on the valve seat when the pressure of the irrigation liquid in the tube is equal to or higher than a predetermined value.

In addition, the present invention provides a trickle irrigation tube includes: a tube; and at least one emitter, the emitter being the above-mentioned emitter.

Advantageous Effects of Invention

The emitter according to the present invention controls the discharge rate of the irrigation liquid in accordance with the pressure of the irrigation liquid in the trickle irrigation tube, and thus can stabilize the discharge rate of the irrigation liquid. In addition, since the emitter according to the present invention can be formed with one or two components by injection molding of a resin material, the manufacturing cost can be further reduced in comparison with conventional emitters composed of three parts.

3

BRIEF DESCRIPTION OF DRAWINGS

FIG. 6A illustrates a top surface, a front surface and a side surface of the emitter according to the embodiment in the state before a film is joined to the emitter main body, and FIG. 6B illustrates a bottom surface, a front surface and a side surface of the emitter;

FIG. 15A is a plan view of a first member of the embodiment, FIG. 15B is a front view of the first member, FIG. 15C is a bottom view of the first member, FIG. 15D is a left side view of the first member, and FIG. 15E is a right side view of the first member;

DESCRIPTION OF EMBODIMENTS

Embodiments of the present invention will be described below in detail with reference to the accompanying drawings. It is to be noted that the shapes in plan view, the size, the angle and the pressure in the following embodiments are merely examples, and may be appropriately changed as long as desired functions of the components of the embodiments are achieved.

Embodiment 1

Configuration

Figure 1:
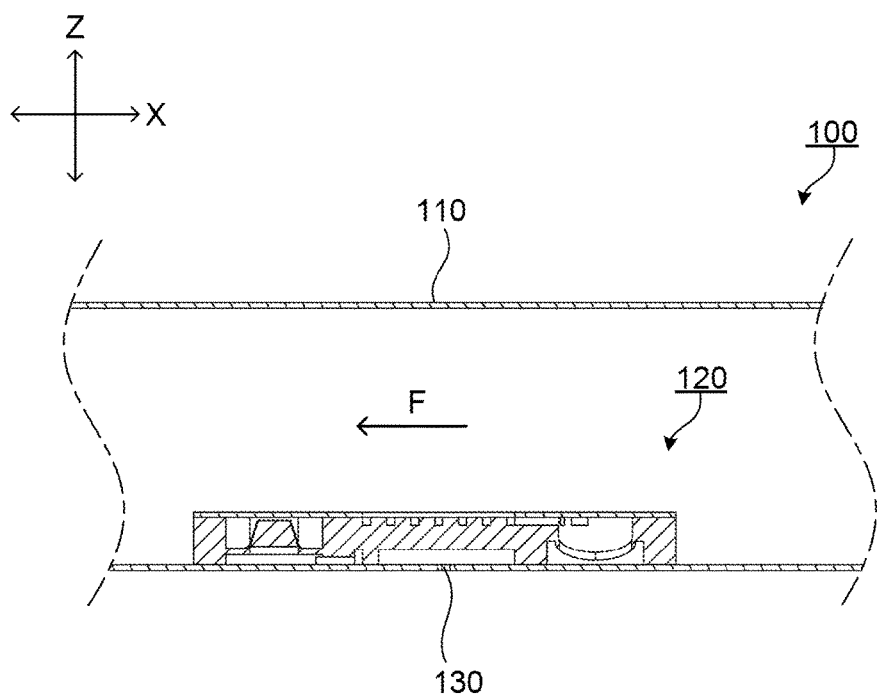
FIG. 1 is a schematic sectional view of a trickle irrigation tube according to Embodiment 1 of the present invention.

FIG. 1 is a schematic sectional view of a trickle irrigation tube according to Embodiment 1 of the present invention. Trickle irrigation tube 100 is composed of tube 110 and emitter 120. Tube 110 is made of polyethylene, for example. Emitter 120 is disposed at a predetermined interval (for example, 200 to 500 mm) in the axial direction of tube 110. Each emitter 120 is joined on the inner wall surface of tube 110. Emitter 120 is disposed at a position where emitter 120 covers discharge port 130 of tube 110. Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
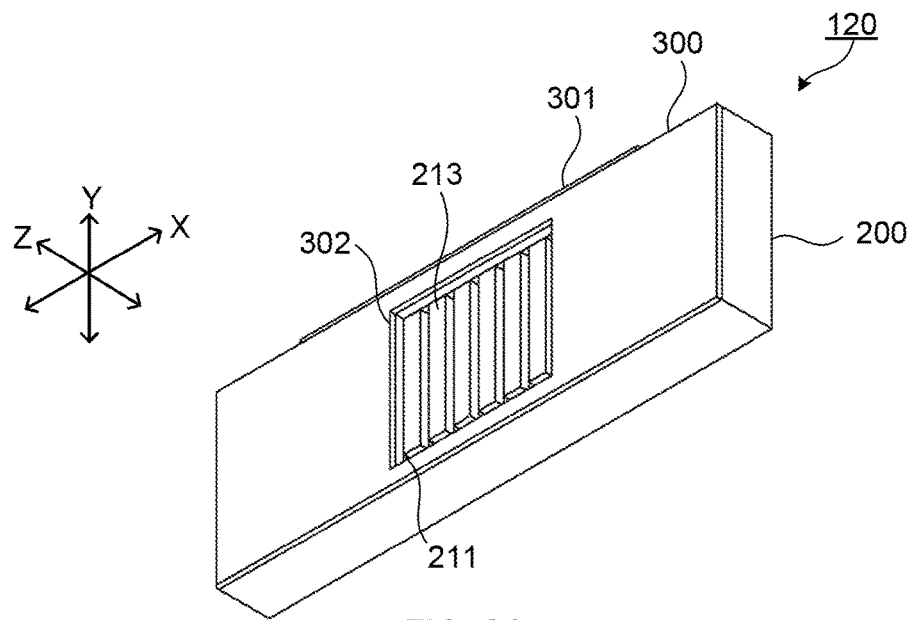
FIG. 2A is a top surface, a front surface and a side surface of the emitter according to the embodiment.
Figure 2B:
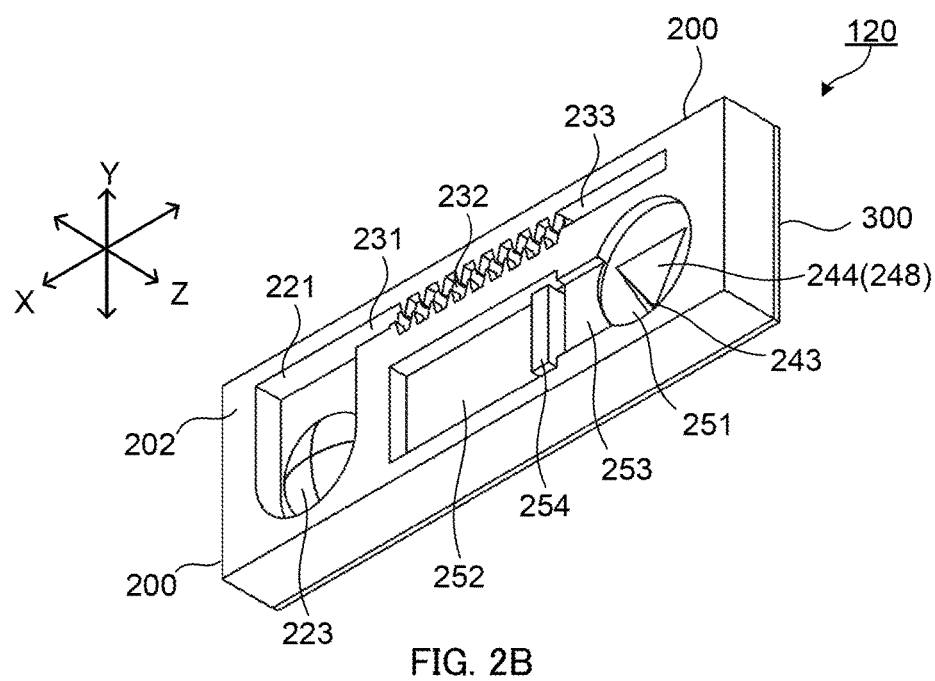
FIG. 2B is a bottom surface, a front surface and a side surface of the emitter.
Figure 3A:
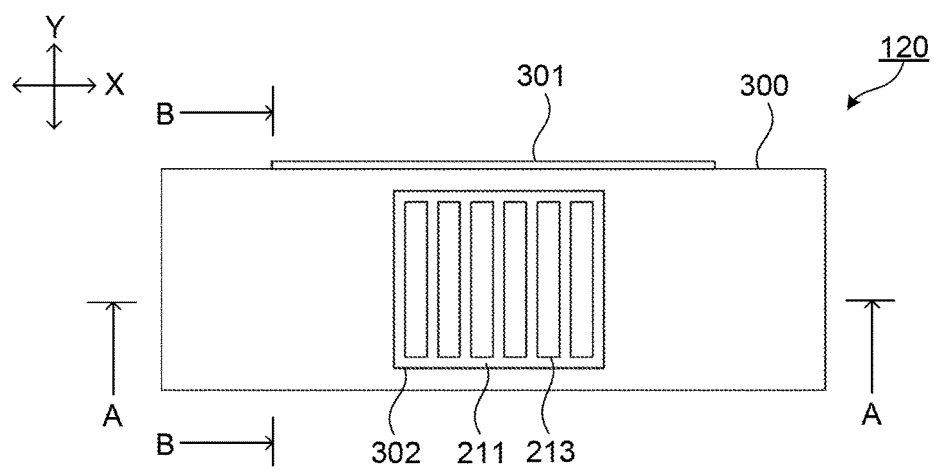
FIG. 3A is a plan view of the emitter according to the embodiment.
Figure 3B:
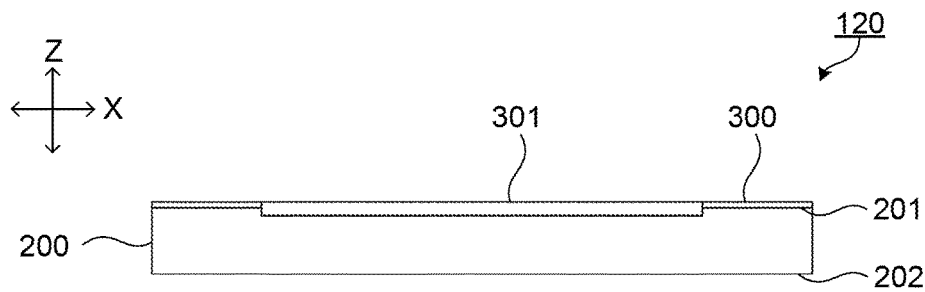
FIG. 3B is a rear view of the emitter.
Figure 3C:
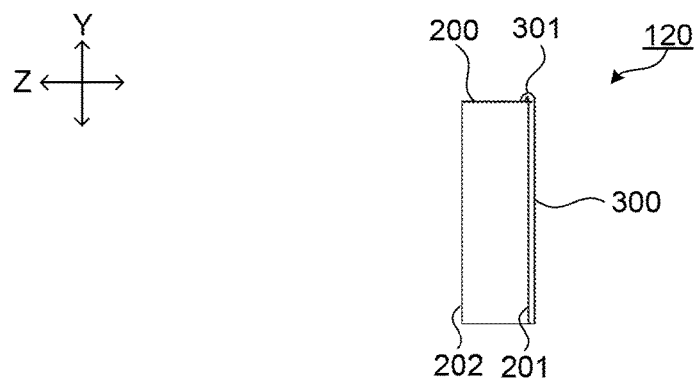
FIG. 3C is a side view of the emitter.
Figure 4A:
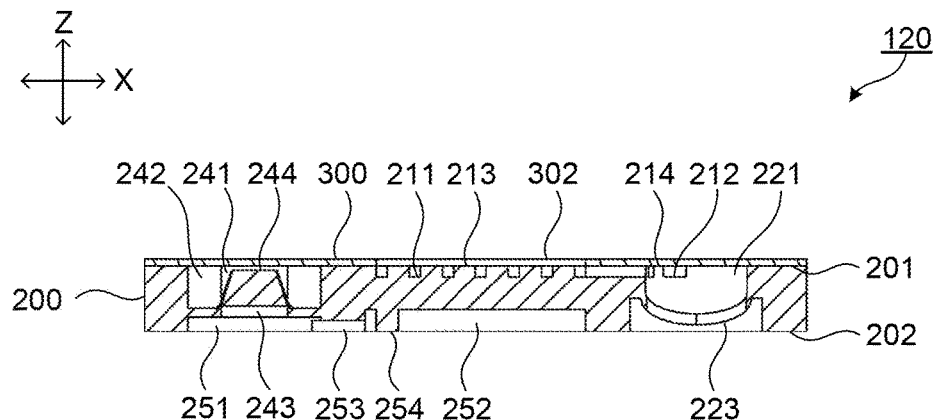
FIG. 4A is a sectional view of the emitter according to the embodiment taken along of line A-A of FIG. 3A.
Figure 4B:
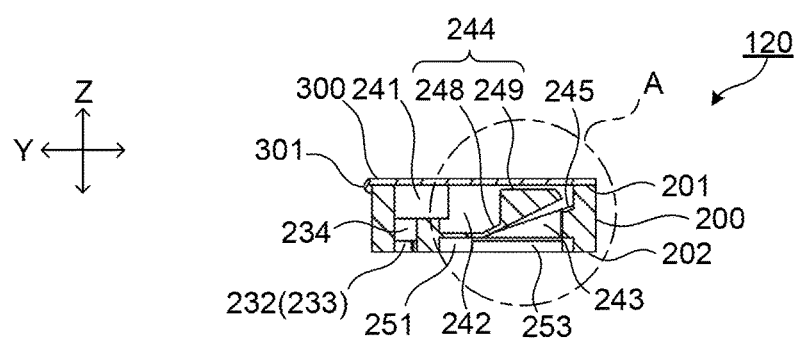
FIG. 4B is a sectional view of the emitter taken along line B-B of FIG. 3A.
Figure 5A:
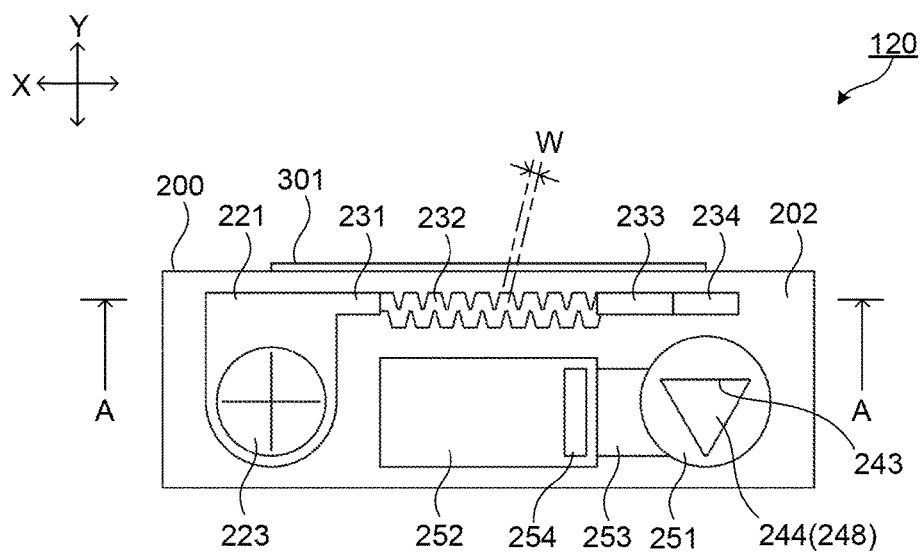
FIG. 5A is a bottom view of the emitter according to the embodiment.
Figure 5B:
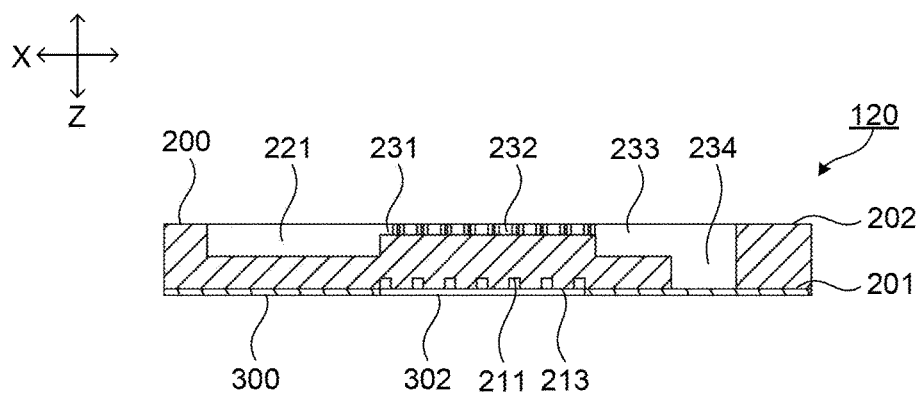
FIG. 5B is a sectional view of the emitter taken along line A-A of FIG. 5A.

FIG. 2A illustrates a top surface, a front surface and a side surface of emitter 120, and FIG. 2B illustrates a bottom surface, a front surface and a side surface of emitter 120. In addition, FIG. 3A is a plan view of emitter 120, FIG. 3B is a rear view of emitter 120, and FIG. 3C is a side view of emitter 120. In addition, FIG. 4A is a sectional view of emitter 120 taken along line A-A of FIG. 3A, and FIG. 4B is a sectional view of emitter 120 taken along line B-B of FIG. 3A. In addition, FIG. 5A is a bottom view of emitter 120, and FIG. 5B is a sectional view of emitter 120 taken along line A-A of FIG. 5A. It is to be noted that the X direction is the axial direction of tube 110 or the longitudinal direction of emitter 120, the Y direction is the short (width) direction of emitter 120, and the Z direction is the height direction of emitter 120. In addition, the direction of arrow F is parallel to the X direction.

As illustrated in FIG. 2A and FIG. 2B, emitter 120 has a cuboid-like external shape. For example, the length of emitter 120 is 30 mm in the X direction, 10 mm in the Y direction, and 3 mm in the Z direction. Emitter 120 includes emitter main body 200 to be joined to the inner wall surface of tube 110, and film 300 which is formed integrally with emitter main body 200.

Figure 7A:
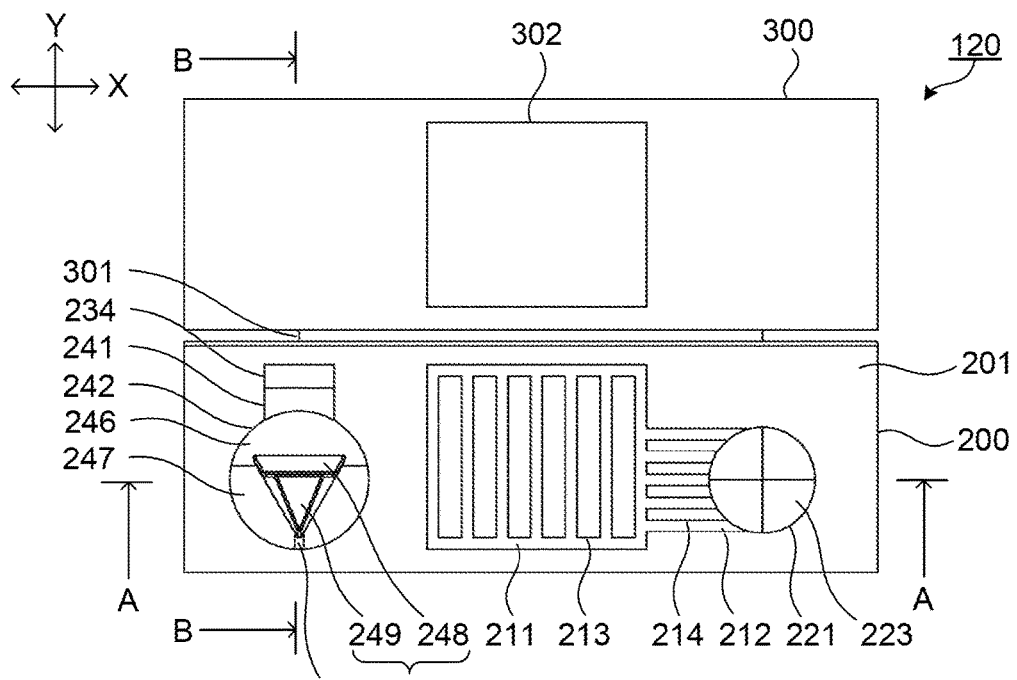
FIG. 7A is a plan view of the emitter according to the embodiment in the state before the film is joined to the emitter main body.
Figure 7B:
FIG. 7B is a rear view of the emitter.
Figure 7C:
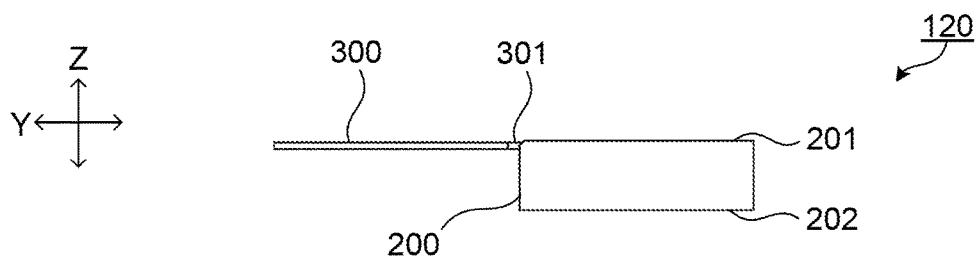
FIG. 7C is a side view of the emitter.
Figure 8A:
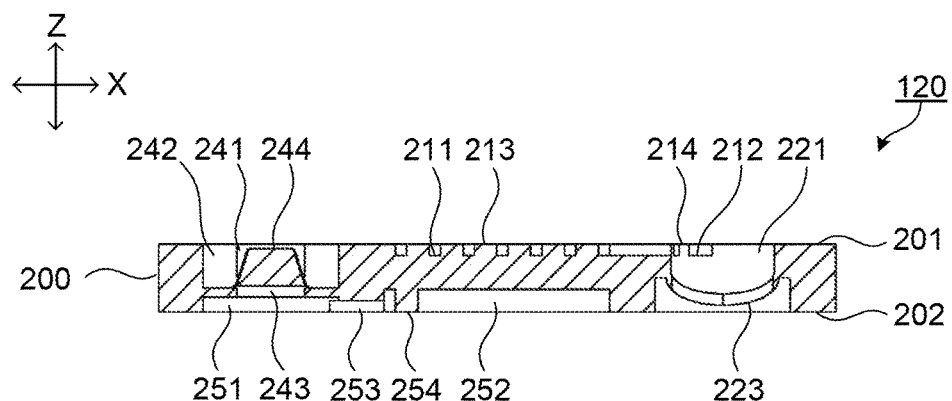
FIG. 8A is a sectional view of the emitter according to the embodiment taken along line A-A in the state before the film is joined to the emitter main body in FIG. 7A.
Figure 8B:
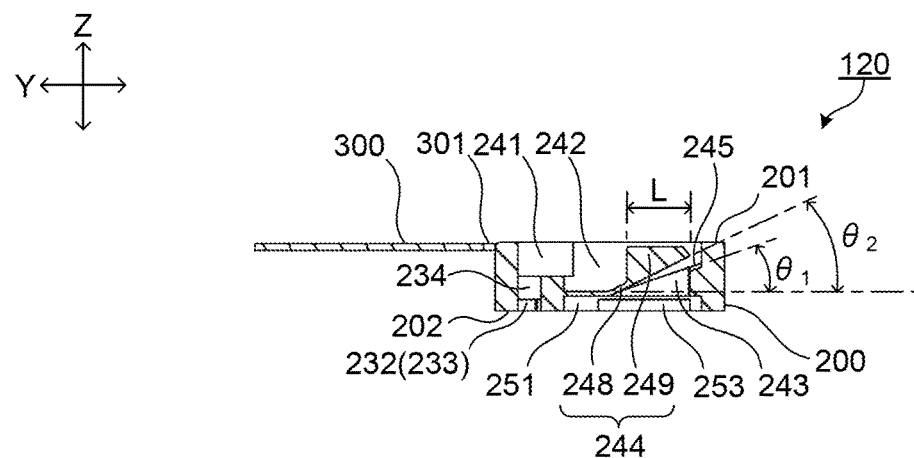
FIG. 8B is a sectional view of the emitter taken along line B-B of FIG. 7A.
Figure 9A:
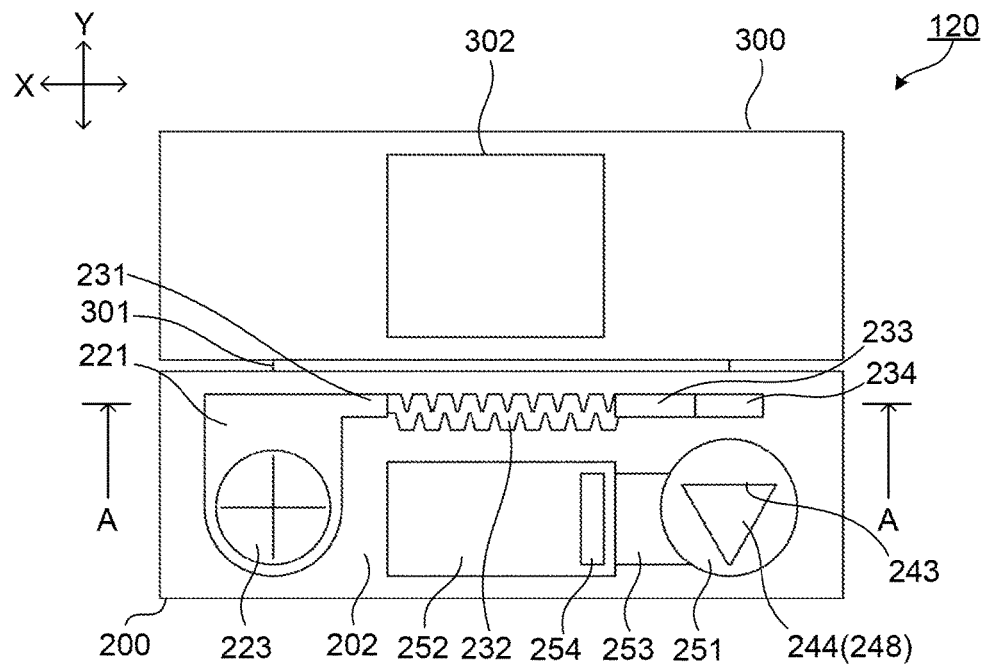
FIG. 9A is a bottom view of the emitter according to the embodiment in the state before the film is joined to the emitter main body.
Figure 9B:
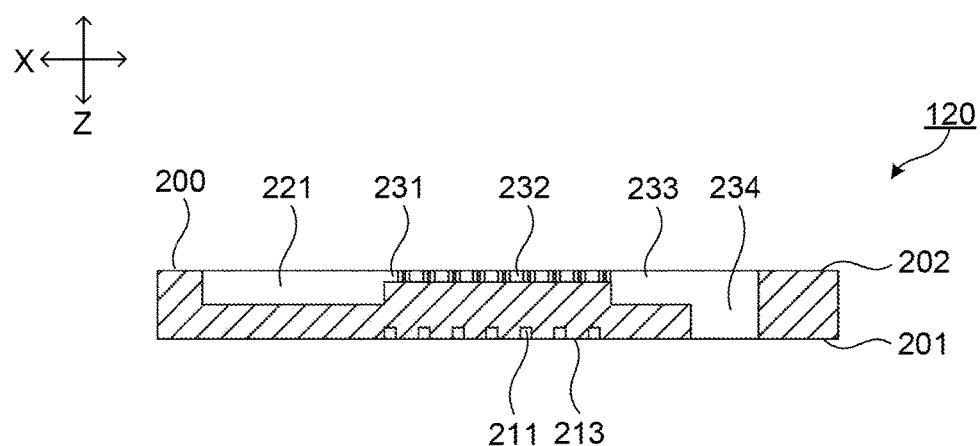
FIG. 9B is a sectional view of the emitter taken along of FIG. 9A line A-A.

FIG. 6A illustrates a top surface, a front surface and a side surface of emitter 120 in the state before film 300 is joined to emitter main body 200, and FIG. 6B illustrates a bottom surface, a front surface and a side surface of emitter 120. In addition, FIG. 7A is a plan view of emitter 120 in the state before film 300 is joined to emitter main body 200, FIG. 7B is a rear view of the emitter 120, and FIG. 7C is a side view of the emitter 120. Further, FIG. 8A is a sectional view of emitter 120 taken along line A-A of FIG. 7A in the state before film 300 is joined to emitter main body 200, and FIG. 8B is a sectional view of the emitter 120 taken along line B-B of FIG. 7A. In addition, FIG. 9A is a bottom view of emitter 120 in the state before film 300 is joined to emitter main body 200, and FIG. 9B is a sectional view of the emitter 120 taken along line A-A of FIG. 9A.

As illustrated in FIG. 3B and FIG. 3C, emitter main body 200 includes first surface 201 and second surface 202. First surface 201 is one surface which is joined to film 300 in the Z direction of emitter main body 200. Second surface 202 is the other surface which is joined to the inner wall surface of tube 110 in the Z direction of emitter main body 200.

As illustrated in FIG. 6A, FIG. 6B, FIG. 7A and FIG. 8A, emitter main body 200 includes recesses 211 and 212 formed on first surface 201, linear protrusions 213 and 214 disposed in recesses 211 and 212, intake channel 221 extending through emitter main body 200 in the Z direction, and flow rate regulation valve 223 disposed in intake channel 221.

As illustrated in FIG. 6A and FIG. 7A, recess 211 is a recess located at a center portion of first surface 201. The shape (hereinafter also referred to as "shape in plan view") of recess 211 as viewed from the Z direction is a rectangular shape.

Recess 212 is a recess located at first surface 201 and configured to connect recess 211 and intake channel 221. As illustrated in FIG. 7B, the length of recess 212 in the Y direction is equal to the diameter of an opening part of intake channel 221 described later.

As illustrated in FIG. 6A and FIG. 7A, linear protrusions 213 are a plurality of linear protrusions disposed in recess 211 side by side in the X direction, and the longitudinal direction of protrusions 213 is aligned in the Y direction. In plan view, linear protrusion 213 has a rectangular shape. A gap is provided between linear protrusions 213 in the X direction, and between linear protrusion 213 and the wall surface of recess 211 in the Y direction.

Linear protrusions 214 are a plurality of linear protrusions disposed side by side in the Y direction in recess 212, and the longitudinal direction of linear protrusions 214 is aligned with the X direction. In plan view, linear protrusion 214 has a shape which is obtained by cutting out one end of a rectangular in an arc shape. A gap is provided between linear protrusions 214 in the Y direction, and between an end of linear protrusion 214 and linear protrusion 213 adjacent to linear protrusion 214 in the X direction.

The distance from the bottom surface of recesses 211 and 212 to the tip end surface of linear protrusions 213 and 214 (the height of linear protrusion 213 and linear protrusion 214) is, for example, 0.5 mm.

The shape of the opening of intake channel 221 at first surface 201 is a circular shape as illustrated in FIG. 7A. Intake channel 221 has an opening diameter of, for example, 5 mm. As illustrated in FIG. 9A, the shape of the opening of intake channel 221 at second surface 202 is a shape (bell shape) which is formed with a semicircle of the above-mentioned circle and a rectangular which has a width of the diameter of the opening and extends in the Y direction from the diameter of the semicircle.

As illustrated in FIG. 7A and FIG. 9A, flow rate regulation valve 223 is composed of four flexible opening-closing parts which closes intake channel 221. As illustrated in FIG. 8A and FIG. 9A, the opening-closing parts have a form in which a substantially hemisphere thin dome protruding from first surface 201 side toward second surface 202 side is divided with slits in a cross shape. The opening-closing part has a thickness of, for example, 0.5 mm, and, normally, the slit has a width of, for example, 0 mm.

As illustrated in FIG. 6B, FIG. 9A and FIG. 9B, emitter main body 200 further includes, on second surface 202, three grooves 231, 232 and 233 and hole 234 communicating between groove 233 and the first surface 201 side.

As illustrated in FIG. 5A and FIG. 9A, groove 231 is connected with intake channel 221. Groove 231 is a linear groove formed on second surface 202 and extending along the X direction.

As illustrated in FIG. 5A and FIG. 9A, groove 232 is connected with groove 231. Groove 232 is a groove formed on second surface 202 and extending along the X direction. In plan view, groove 232 has a zigzag shape. In the zigzag shape, protrusions having a substantially triangular shape protruding from the side surface of groove 232 are alternately disposed along the extending direction (the X direction) of groove 232. The protrusions are disposed such that the tip of each protrusion does not exceed the central axis line of groove 232 in plan view. Groove 232 has a depth of, for example, 0.5 mm, and groove 232 has a width (W in FIG. 5) of, for example, 0.5 mm.

As illustrated in FIG. 5A and FIG. 9A, groove 233 is connected with groove 232. Groove 233 is a linear groove formed on second surface 202 and extending along the X direction.

As illustrated in FIG. 5A and FIG. 9A, hole 234 opens at an end portion of groove 233. The opening shape of hole 234 is a rectangular shape. As illustrated in FIG. 5B and FIG. 9B, hole 234 opens at first surface 201. Grooves 231 and 233 and hole 234 have a width (the length in the Y direction) of, for example, 1 mm.

As illustrated in FIG. 6A, FIG. 7A and FIG. 8A, emitter main body 200 further includes groove 241 formed on first surface 201, recess 242 formed on first surface 201, hole 243 which opens at the bottom of recess 242 and communicates with second surface 202 side, flap 244 which can open and close hole 243, and groove 245 formed at the opening part of hole 243.

As illustrated in FIG. 7A, groove 241 is a linear groove formed on first surface 201 and extending along the Y direction and in plan view, groove 241 has a rectangular shape. Hole 234 opens at one end of groove 241 and recess 242 is connected with the other end of groove 241.

As illustrated in FIG. 7A, recess 242 is a bottomed recess formed on first surface 201. In plan view, recess 242 has a circular shape. The opening diameter of recess 242 is, for example, 6 mm, and the depth of recess 242 is, for example, 2 mm. As illustrated in FIG. 7A and FIG. 8B, the bottom surface of recess 242 includes plane part 246 which has an arch shape in plan view and has a smaller size, and a part (tilted part 247) which has an arch shape having a greater size in plan view and is tilted from groove 241 side toward first surface 201. Plane part 246 is a plane which is parallel to first surface 201, and since recess 251 described later is located on a side opposite to recess 242 in the Z direction, plane part 246 is formed in a thin plate shape and has a thickness of, for example, 0.2 mm.

As illustrated in FIG. 8B, hole 243 opens at tilted part 247 in such a manner as to make contact with bottom edge of tilted part 247. As illustrated in FIG. 9A, hole 243 has a regular triangular shape in plan view.

As illustrated in FIG. 7A, flap 244 includes flap plate 248 and protrusion 249 protruding from flap plate 248. In plan view, flap 244 has a regular triangular shape as illustrated in FIG. 7A, which is identical to the shape of hole 243 in plan view. Thus, as viewed along the axis direction of hole 243 (the Z direction), the shape of flap 244 is identical to that of hole 243. The length of the base end edge of flap plate 248 (a side of the opening shape of hole 243) is, for example, 4 mm. In addition, the length (L in FIG. 8B) of protrusion 249 in the Y direction is, for example, 2.7 mm.

As illustrated in FIG. 7A and FIG. 8B, flap plate 248 is composed of a thin plate part which is bent with one side of the opening shape of hole 243 as a fold line part. Thus, flap 244 is configured integrally with emitter main body 200 so as to be turnable about the fold line part. Thus, the opening shape of hole 243 includes a linear part, and flap 244 has a linear fixed end at the linear part and is configured to be turnable about the fixed end. It is to be noted that flap plate 248 has a thickness of, for example, 0.2 mm.

In addition, as illustrated in FIG. 8B, flap plate 248 is tilted with respect to plane part 246 more than tilted part 247. For example, the inclination angle $\theta_1$ of tilted part 247 to the surface of plane part 246 is 19°, and inclination angle $\theta_2$ of flap plate 248 to the bottom surface and the surface of plane part 246 is 26.6°. In plan view, the size of the gap between hole 243 and flap 244 is largest at a position between the apex of hole 243 and a tip end (apex) of flap 244, and the size of the gap at that position is, for example, 0.5 mm. Thus, as viewed along an axis for the turning (in the Y direction), flap plate 248 where flap 244 makes close contact with the opening edge of hole 243 is disposed obliquely to tilted part 247 which includes other portions than the linear part the opening edge of hole 243 in a non-contact manner.

In plan view, protrusion 249 has a triangular shape and is included in the shape of flap 244 as illustrated in FIG. 7A. To be more specific, protrusion 249 has a triangular shape in plan view, and each side surface of protrusion 249 is composed of a tapered surface which is tilted from hole 243 side toward the opening part of recess 242 at each side of the triangular shape as illustrated in FIG. 7A and FIG. 8A. With this configuration, protrusion 249 has an isosceles triangular shape in plan view, and the length of the base is, for example, 2.1 mm. As illustrated in FIG. 8B, the top surface of protrusion 249 is parallel to the opening edge of recess 242. In the Z direction, the distance between the opening edge and the top surface is, for example, 0.2 mm.

As illustrated in FIG. 7A, groove 245 is a groove which is formed on the surface of tilted part 247 and is connected with the apex of the opening shape of hole 243. Groove 245 has a width of, for example, 0.25 mm, and groove 245 has a depth from tilted part 247 of, for example, 0.1 mm.

As illustrated in FIG. 5A and FIG. 9A, emitter main body 200 further includes linear protrusion 254 and recesses 251, 252 and 253 formed on second surface 202.

As illustrated in FIG. 9A, each of recesses 251, 252 and 253 is a recess formed on second surface 202. In plan view, recess 251 has a circular shape, and hole 243 opens at the bottom of recess 251. In plan view, recess 252 has a rectangular shape, and linear protrusion 254 is disposed on the bottom of recess 252. Recess 253 is a recess which connects recess 251 and recess 252, and is shallower than the recesses. In the Y direction, recess 253 has a length smaller than the length of recess 252.

As illustrated in FIG. 9A, linear protrusion 254 is a slender linear protrusion extending along the Y direction. In plan view, linear protrusion 254 has a rectangular shape, and the length of linear protrusion 254 in the Y direction is smaller than the length of recess 252 in the Y direction and is substantially equal to the length of recess 253 in the Y direction. In the X direction, linear protrusion 254 is disposed at a position near recess 253 but is separated from recess 253. Thus, as viewed from recess 252 side along the X direction, linear protrusion 254 is disposed at a position where linear protrusion 254 overlaps recess 253.

As illustrated in FIG. 7A and FIG. 9A, film 300 is disposed integrally with emitter main body 200 through hinge part 301. Hinge part 301 is disposed at an edge of first surface 201 of emitter main body 200 in the Y direction. For example, hinge part 301 is a portion having a thickness equal to that of film 300 and a width of 0.5 mm, and is formed integrally with emitter main body 200 and film 300.

As illustrated in FIG. 7A and FIG. 9A, film 300 further includes rectangular opening part 302 at a position corresponding to first recess 211 in the state where film 300 covers first surface 201. For example, the thickness of film 300 may be determined by a computer simulation or an experiment using a trial product or the like on the basis of the deformation amount under a pressure described later, and may be, for example, 0.15 mm.

Each of emitter main body 200 and film 300 is molded with one material having flexibility such as polypropylene, for example. Examples of the material include resin and rubber, and examples of the resin include polyethylene and silicone. The flexibility of emitter 120 and film 300 can be adjusted with use of elastic resin materials, and for example, can be adjusted by the type of an elastic resin, the mixing ratio of an elastic resin material to a hard resin material, and the like. Emitter 120 can be manufactured as an integrally molded member by injection molding, for example.

(Operation)

Film 300 turns about hinge part 301, and is closely joined on first surface 201 of emitter main body 200. For example, the joining is performed by welding of a resin material of emitter main body 200 or film 300, by bonding using an adhesive agent, by pressure bonding of film 300 to emitter main body 200 or the like.

As illustrated in FIG. 2A and FIG. 4A, when film 300 is joined to first surface 201, intake channel 221 and recess 212 are covered with film 300, and the gap between linear protrusions 214 opens at recess 211 and forms a plurality of channels connected with intake channel 221. Thus, when film 300 is joined to first surface 201, intake channel 221 and the gap constitute an intake part for receiving the irrigation liquid in tube 110.

In addition, when film 300 is joined to first surface 201, groove 241 and recess 242 are covered with film 300 as illustrated in FIG. 4A and FIG. 4B. The gap between recess 242 and film 300 constitute a channel for irrigation liquid. When film 300 is joined to first surface 201, recess 242, hole 243 and flap 244 constitute a flow rate controlling part for controlling the flow rate of the irrigation liquid supplied from a pressure reduction channel described later in accordance with the pressure of the irrigation liquid in tube 110.

Flap 244 is disposed at a position separated from film 300 such that flap 244 can open and close hole 243. Flap 244 serves as a valve element for opening and closing hole 243 which forms a channel for irrigation liquid. In addition, as described later in detail, flap plate 248 makes close contact with the opening edge of hole 243 when flap 244 is closed. Thus, the opening edge of hole 243 serves as a valve seat on which flap 244 sits when flap 244 closes hole 243.

Second surface 202 is joined to the inner wall surface of tube 110. This joining is also performed by welding of the resin material of emitter main body 200 or tube 110, by bonding using adhesive agent, by pressure bonding of emitter main body 200 to tube 110, or the like.

When second surface 202 is joined to the inner wall surface of tube 110, second surface 202 makes close contact with tube 110, and intake channel 221 and grooves 231 to 233 are covered with tube 110. When grooves 231 to 233 is covered with tube 110, grooves 231 to 233 and hole 234 constitute a channel through which the irrigation liquid received from the intake part flows. Among them, groove 232 serves as a pressure reduction channel for allowing the irrigation liquid to flow therethrough while reducing the pressure of the irrigation liquid.

In addition, when second surface 202 is joined to the inner wall surface of tube 110, recesses 251, 252 and 253 are covered with tube 110. Discharge port 130 is disposed at a position where tube 110 covers recess 252. In this manner, when second surface 202 is joined to tube 110, recess 252 constitutes a discharge part to which the irrigation liquid having a flow rate controlled by the flow rate controlling part is supplied and which is configured to face discharge port 130.

Normally, emitter 120 is joined to the inner periphery wall of tube 110 before discharge port 130 is formed, and thereafter, discharge port 130 is formed at a position corresponding to discharge part (recess 252) of tube 110. Alternatively, emitter 120 may be joined to the inner wall surface of tube 110 such that emitter 120 is located at the position of preliminarily provided discharge port 130.

Figure 10A:
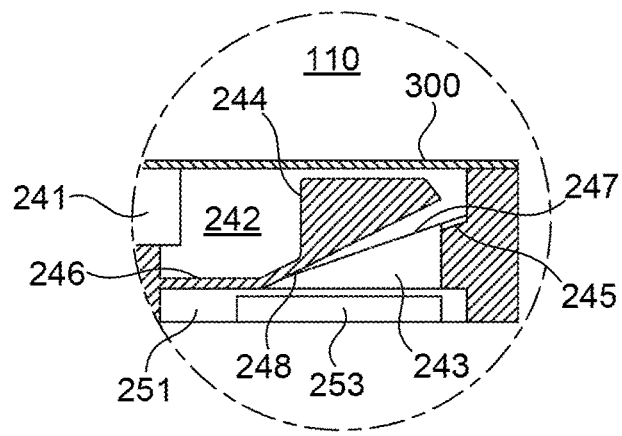
FIG. 10A illustrates part A of FIG. 4B in an enlarged manner in the case where the pressure of the irrigation liquid in the tube is equal to or higher than a first pressure value and lower than a second pressure value.
Figure 10B:
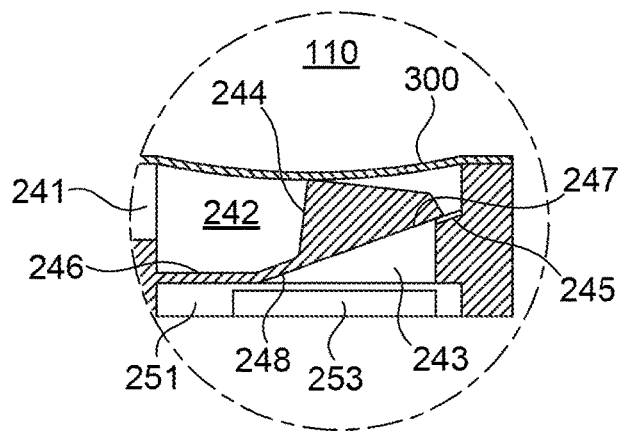
FIG. 10B illustrates part A of FIG. 4B in an enlarged manner in the case where the pressure of the irrigation liquid in the tube is reset to a pressure equal to or higher than the second pressure value.
Figure 10C:
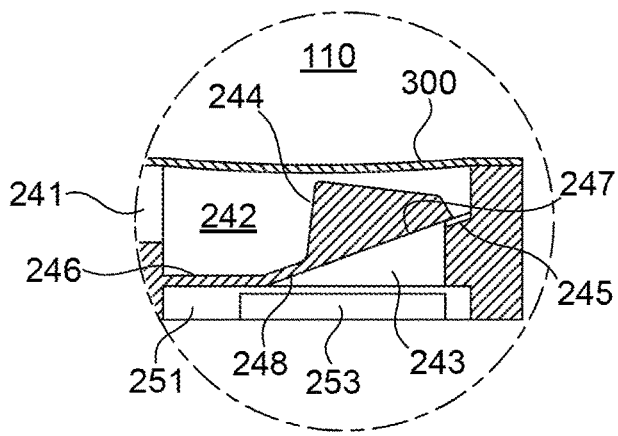
FIG. 10C illustrates part A of FIG. 4B in an enlarged manner in the case where the pressure of the irrigation liquid in the tube is equal to or higher than the first pressure value and lower than the second pressure value.

Next, discharge of irrigation liquid by emitter 120 is described. FIG. 10A illustrates part A of FIG. 4B in an enlarged manner in the case where the pressure of the irrigation liquid in tube 110 is equal to or higher than the first pressure value and lower than the second pressure value, FIG. 10B illustrates part A of FIG. 4B in an enlarged manner in the case where the pressure of the irrigation liquid in tube 110 is equal to or higher than the second pressure value, and FIG. 10C illustrates part A of FIG. 4B in an enlarged manner in the case where the pressure of the irrigation liquid in tube 110 is reset to a pressure equal to or higher than the first pressure value and lower than the second pressure value.

Supply of the irrigation liquid to trickle irrigation tube 100 is performed in a range where the pressure of the irrigation liquid does not exceed 0.1 MPa for example in view of preventing the damaging of tube 110 and emitter 120. When the irrigation liquid is supplied into tube 110, the irrigation liquid reaches recess 212 covered with film 300 in the Z direction through the gap between recess 211 and linear protrusion 213, and reaches intake channel 221 through the gap between recess 212 and linear protrusion 214. Recess 211 and linear protrusion 213, and recess 212 and linear protrusion 214 constitute a channel for the irrigation liquid and prevent intrusion of floating materials in the irrigation liquid larger than the gap between the linear protrusions. In this manner, recesses 211 and 212 and linear protrusions 213 and 214 function as a filter.

When the pressure of the irrigation liquid in tube 110 is equal to or higher than the first pressure value (for example, 0.005 MPa), flow rate regulation valve 223 is pushed to second surface 202 side, and the slit of flow rate regulation valve 223 is expanded. In this manner, the irrigation liquid reaching intake channel 221 is received into emitter main body 200 from intake channel 221. Flow rate regulation valve 223 suppresses inflow of the irrigation liquid to emitter main body 200 when the pressure of the irrigation liquid is lower than the first pressure. Thus, high-pressure supply of the irrigation liquid to tube 110 can be achieved, and therefore the configuration in which emitter 120 has flow rate regulation valve 223 is favorable for forming trickle irrigation tube 100 having a greater length, for example.

The irrigation liquid received from intake channel 221 is supplied to groove 232 (pressure reduction channel) through groove 231. The pressure of the irrigation liquid flowing through groove 232 is reduced as a result of pressure loss caused by the shape (zigzag shape) in plan view of groove 232. In addition, floating materials in the irrigation liquid are entangled in the turbulent flow generated between the protrusions of groove 232 and are retained in groove 232. In this manner, the floating materials are further removed from the irrigation liquid by pressure reduction channel 230.

In addition, since the tip of the protrusion is disposed in such a manner that the tip does not exceed the center line of groove 232 in plan view, a space which is not blocked by the protrusion is formed at the center of groove 232 while the width of the space is small, and thus the irrigation liquid easily flow through groove 232. Accordingly, in addition to the effect of reducing pressure and the effect of removing the floating material, groove 232 is favorable for allowing irrigation liquid to flow with a greater flow rate.

The irrigation liquid having passed through groove 232 in which the pressure is reduced and the floating material is removed is supplied to recess 242 through groove 233, hole 234, and groove 241. The gap between film 300 and recess 242 is filled with the irrigation liquid, and the irrigation liquid is supplied to hole 243 (FIG. 10A).

The irrigation liquid having passed through hole 243 reaches recess 252 through recessed 251 and 253 and is then discharged out of tube 110 through discharge port 130 which faces recess 252 and opens at recess 252.

It is to be noted that foreign matters such as soil may intrude into recess 252 from discharge port 130, intrusion of such foreign matters into hole 243 is blocked by linear protrusion 254 disposed in recess 252.

As the pressure of the irrigation liquid in tube 110 increases, the flow rate of the irrigation liquid to be received into emitter main body 200 from intake channel 221 increases, and the discharge rate of the irrigation liquid from discharge port 130 increases.

When the pressure of the irrigation liquid in tube 110 is equal to or higher than a second pressure value (for example 0.02 MPa), film 300 bends under the pressure of the irrigation liquid in tube 110, and pushes flap 244 toward hole 243 as illustrated in FIG. 10B. Flap 244 and hole 243 have the same shape in plan view, and the bottom surface of flap plate 248 is tilted with respect to tilted part 247 where hole 243 opens by a slight angle (by angle obtained by subtracting $\theta_1$ from $\theta_2$). Accordingly, since one side of the triangular shape is the fixed end, the distance from the fixed end to two sides of flap plate 248 along the bottom surface of flap plate 248 is greater than the distance from the fixed end to the two sides of hole 243 along the opening edge of hole 243. Thus, flap plate 248 covers the opening part of hole 243, and the peripheral portion of flap plate 248 of flap 244 serving as a valve element makes close contact with (sits on) the opening edge of hole 243 serving as a valve seat. Thus, flap 244 functions as a valve element which seals hole 243 serving as a channel for irrigation liquid, and the opening edge of hole 243 functions as a valve seat on which the valve element sits.

However, since groove 245 is formed on the surface of the opening edge of hole 243 serving as a valve seat, groove 245 communicates between the inside of recess 242 which is a channel on the upstream side relative to the valve seat of irrigation liquid and hole 243 which is a channel on the downstream side of the valve seat when flap 244 serving as the valve element sits on the valve seat. In this manner, the irrigation liquid supplied to recess 242 is supplied to hole 243 through groove 245.

Consequently, the amount of the irrigation liquid which passes through the flow rate controlling part is restricted to a flow rate which can pass through groove 245, and the discharge rate of the irrigation liquid from discharge port 130 becomes substantially constant. In this manner, emitter 120 quantitatively discharges the irrigation liquid from tube 110 supplied with the irrigation liquid.

When hole 243 is closed by flap 244, the pressure in recess 242 is normally high relative to the pressure in hole 243. Accordingly, as illustrated in FIG. 10C, even when the pressure of the irrigation liquid in tube 110 is reduced to a pressure lower than the second pressure value, a pressure difference obtained by subtracting the inner pressure of hole 243 from the inner pressure of recess 242 is a positive pressure, and in addition, in the case where the inner pressure of recess 242 is greater than the elastic force of returning to the initial position of flap 244, flap 244 keeps closing hole 243 even when the pressure of the irrigation liquid in tube 110 is once increased to the second pressure value and thereafter reduced to a value lower than the second pressure value. Thus, the amount of the irrigation liquid passing through the flow rate controlling part is continuously restricted to the flow rates which can pass through groove 245.

When the irrigation liquid in recess 242 sufficiently flows through groove 245, the inner pressure of recess 242 is sufficiently reduced. Then, when the pressure difference is reduced to a value smaller than the elastic force, flap 244 returns to the initial position with the elastic force, and hole 243 is opened as illustrated in FIG. 10A. Then, the irrigation liquid in recess 242 again flows to hole 243 through the gap between flap 244 and the opening part of hole 243.

(Effect)

As described, emitter 120 is an emitter for quantitatively discharging irrigation liquid in tube 110 to outside of tube 110, tube 110 being configured for allowing the irrigation liquid to flow therethrough, emitter 120 being configured to be disposed on tube 110 and including: the intake part for receiving the irrigation liquid in tube 110; the pressure reduction channel for allowing the irrigation liquid received from the intake part to flow therethrough while reducing a pressure of the irrigation liquid; the flow rate controlling part for controlling a flow rate of the irrigation liquid supplied from the pressure reduction channel in accordance with a pressure of the irrigation liquid in tube 110 or in the intake part; and the discharge part which is supplied with the irrigation liquid which has a flow rate controlled by the flow rate controlling part and is to be discharged to the outside of tube 110; the flow rate controlling part including: the valve element for opening and closing a channel of the irrigation liquid, the valve seat on which the valve element sits when the valve element closes the channel of the irrigation liquid, film 300 for pushing the valve element toward the valve seat by being bent under the pressure of the irrigation liquid in tube 110 or in the intake part such that the valve element sits on the valve seat, and groove 233 formed on a surface of the valve seat, and configured to communicate between the channel of the irrigation liquid on an upstream side of the valve seat and the channel of the irrigation liquid on a downstream side of the valve seat when the valve element sits on the valve seat. Then, when the pressure of the irrigation liquid in tube 110 is equal to or higher than a predetermined value, film 300 pushes the valve element to sit the valve element on the valve seat. Thus, emitter 120 can stabilize the discharge rate of the irrigation liquid. Further, emitter 120 may be composed of two injection-molded articles at most. Therefore, emitter 120 can further reduce manufacturing cost in comparison with conventional emitters composed of three parts.

In addition, emitter 120 has the configuration in which emitter 120 is an emitter for quantitatively discharging the irrigation liquid in tube 110 from the discharge port, emitter 120 being configured to be joined to an inner wall surface of tube 110 at a position corresponding to a discharge port configured to communicate between inside and outside of tube 110; the flow rate controlling part includes: an opening part (recess 242) for forming a part of a channel of the irrigation liquid on a downstream side of the pressure reduction channel in emitter 120, the opening part opening at a surface of emitter 120 at a position (first surface 201) where the surface of emitter 120 is not joined to the inner wall surface, film 300 configured to seal the opening part and block communication between the channel on the downstream side of the pressure reduction channel and the inside of tube 110, hole 243 opening at the channel on the downstream side of the pressure reduction channel to face film 300, hole 243 243 being communicated with the discharge part, and the valve element (flap 244) disposed such that the valve element forms a gap between flap 244 at least a part of an opening edge of the hole and is allowed to make contact with the opening edge and allowed to be separated from the opening edge; and at least a part of the opening edge of hole 243 243 constitutes the valve seat. This configuration is further effective from the viewpoint of forming the emitter which can achieve the above-mentioned effect and which is to be disposed inside tube 110.

In addition, an opening shape of hole 243 includes a linear part; the valve element includes a linear fixed end at the linear part, and is turnable about the fixed end as a turning axis; the valve element has a shape identical to a shape of hole 243 as viewed along an axis direction of hole 243; and a portion where the valve element makes close contact with the valve seat is disposed obliquely to other portion of the opening edge of hole 243 other than the linear part without making contact with the other portion as viewed along the turning axis. This configuration makes it possible to form the flow rate controlling part by injection molding with one component, and therefore is further effective from the standpoint of reducing of manufacturing cost.

In addition, with the configuration in which the intake part further includes flow rate regulation valve 223 for expanding the channel for the irrigation liquid when the pressure of the irrigation liquid in tube 110 is equal to or higher than a predetermined value, the irrigation liquid can be supplied to tube 110 with a higher pressure, and therefore the configuration is favorable from the standpoint of forming trickle irrigation tube 100 having a greater length.

In addition, with the configuration in which emitter 120 is molded with one material having flexibility and film 300 is integrally molded as a part of emitter 120, emitter 120 can be produced as one component by injection molding, and therefore the configuration is further effective from the standpoint of reducing manufacturing cost.

In addition, the configuration in which hole 243 is opened and closed with flap 244 which opens and closes about the fixed end is favorable for increasing the maximum size of the gap between flap 244 (valve element) and hole 243. This configuration is further effective from the view point of suppressing the clogging of the above-mentioned gap. In addition, a channel having a greater size of irrigation liquid and extending to hole 243 is formed with opened flap 244, and thus the irrigation liquid in recess 242 easily flows to hole 243. Therefore, the configuration is further effective from the view point of increasing the discharge rate of the irrigation liquid, and from the view point of increasing the variation of the flow rate of the irrigation liquid with the opening and closing of flap 244.

In addition, once flap 244 is closed, flap 244 is kept closed until the pressure difference obtained by subtracting the inner pressure of hole 243 from the inner pressure of recess 242 is sufficiently reduced (to a value smaller than the above-described elastic force). Accordingly, when the flow rate of the irrigation liquid in the case where the irrigation liquid flows only through groove 245 is set to a predetermined discharge rate of emitter 120, the flow rate of the irrigation liquid significantly varies depending on the opening and closing of flap 244 as described above, and thus the discharge rate of emitter 120 quickly returns to the above-mentioned predetermined discharge rate, which is further effective from the viewpoint of quickly achieving the predetermined discharge rate, and from the viewpoint of maintaining the rate for a long period of time.

In addition, since the configuration in which the turning axis of flap 244 has a linear shape is favorable for performing the opening and closing of flap 244 (turning) with a smaller force, the configuration is further effective from the viewpoint of precisely setting the predetermined discharge rate of the irrigation liquid in emitter 120.

In addition, since the configuration in which each of hole 243 and flap 244 has a triangular shape in plan view is favorable for reducing the contact length of the valve element and the valve seat, the configuration is further effective from the viewpoint of preventing displacement of flap 244 when flap 244 seals hole 243.

When emitter 120 is joined to the inner wall surface of tube 110, trickle irrigation tube 100 including tube 110 and emitter 120 disposed to tube 110 is provided. Since trickle irrigation tube 100 can quickly achieve a predetermined discharge rate and maintain the rate for a long period of time, irrigation liquid can be discharged substantially at the predetermined discharge rate at all times. Accordingly, trickle irrigation tube 100 is favorably used for growing of plants which requires further precise discharge of irrigation liquid, for example.

(Modification)

In trickle irrigation tube 100, the above-described configurations may be partially changed, or other configurations may be additionally provided as long as the above-described effect is achieved.

For example, tube 110 may be a seamless tube, or a tube composed of slender sheet(s) joined together along the longitudinal direction.

In addition, discharge port 130 may be a gap formed at the above-mentioned joining part of the sheets so as to communicate between the inside and the outside of tube 110, or a pipe sandwiched by the sheets at the joining part. Further, the shape of the discharge port in an axial direction thereof may not be a straight line shape. Examples of the tube having the discharge port include a tube in which a depression having a desired shape and serving as a channel is formed on the surface of the above-mentioned sheet(s), and a discharge port composed of the channel is formed at the joining part when the sheets are joined together.

While intake channel 221 is located at a position on the upstream side in the flow direction of the irrigation liquid in tube 110, intake channel 221 may be located at a position on the downstream side. In addition, the orientations of a plurality of emitters 120 in one tube 110 may be identical to each other or different from each other.

In addition, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the components on the first surface 201 side are molded integrally with film 300. With the configuration in which emitter main body 200 is composed of the two components, the above-mentioned pressure reduction channel can be disposed inside emitter main body 200, for example. Further, the two components may be integrally molded through a hinge part.

In addition, the channel connecting intake channel 221 and recess 242 which include the pressure reduction channel may be composed of a groove on first surface 201 covered with film 300 in emitter main body 200.

In addition, second surface 202 may be a curved surface along the inner wall of tube 110 (for example, a surface defined by the arc whose arc radius is the internal diameter of tube 110 in the YZ plane).

Further, since it suffices to appropriately dispose flow rate regulation valve 223 in accordance with the pressure of the irrigation liquid supplied to tube 110, emitter 120 may not be provided with flow rate regulation valve 223.

While emitter 120 preferably include a pressure reduction channel having the above-mentioned shape from the viewpoint of ensuring a predetermined discharge rate, emitter 120 may not be provided with the pressure reduction channel. For example, while film 300 bends toward recess 242 and pushes flap 244 in accordance with the pressure difference between the pressure of the irrigation liquid in tube 110 and the pressure of the irrigation liquid in recess 242, channels other than the pressure reduction channel having the above-described shape (for example, a simple linear channel) may be adopted as long as the channel from the intake part to the flow rate regulating part sufficiently provides the pressure difference.

While flap 244 includes protrusion 249 having a substantially triangular pyramidal trapezoidal shape with a regular triangular bottom surface and an isosceles triangular top surface, flap 244 may not be provided with protrusion 249 as long as bending of film 300 in accordance with a predetermined value of the pressure of the irrigation liquid in tube 110 is transmitted. For example, flap 244 may include a rod-shaped protrusion protruding from an end portion of flap 244 toward film 300 in place of the above-mentioned shape protrusion 249. Alternatively, flap 244 may be provided with the above-mentioned rod-shaped protrusion for film 300 to push flap 244 without being provided with protrusion 249.

Embodiment 2

Figure 11:
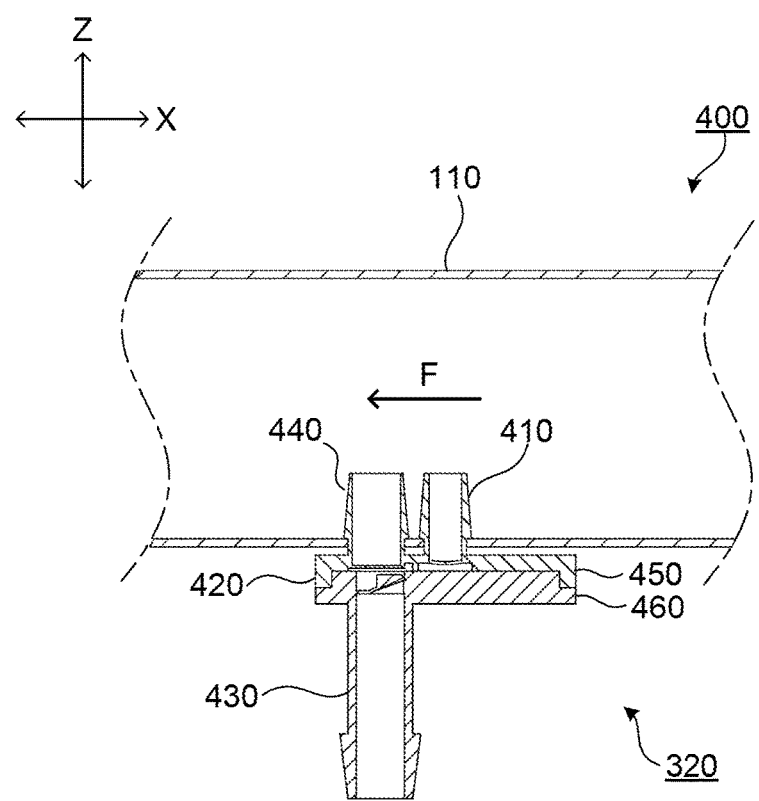
FIG. 11 is a schematic sectional view of a trickle irrigation tube according to a second embodiment of the present invention.

Now Embodiment 2 of the present invention is described.
(Configuration)
FIG. 11 is a schematic sectional view of trickle irrigation tube 400 according to Embodiment 2 of the present invention. Trickle irrigation tube 400 is composed of tube 110 and emitter 320. The configuration of tube 110 is identical to that of the above-described Embodiment 1.

Figure 12A:
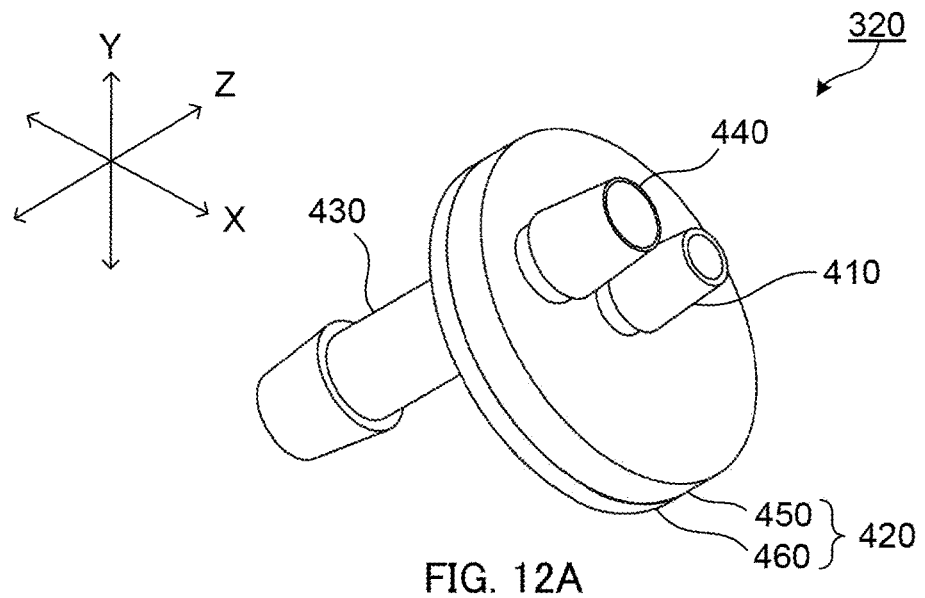
FIG. 12A is a perspective view of the emitter according to the embodiment as viewed from the tube side.
Figure 12B:
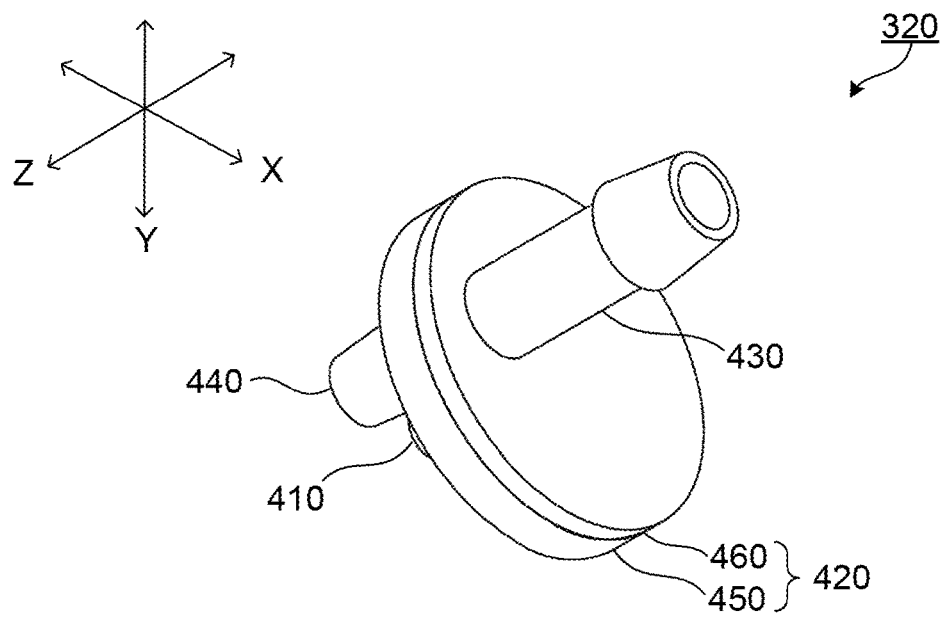
FIG. 12B is a perspective view of the emitter as viewed from a side opposite to the tube side.
Figure 13A:
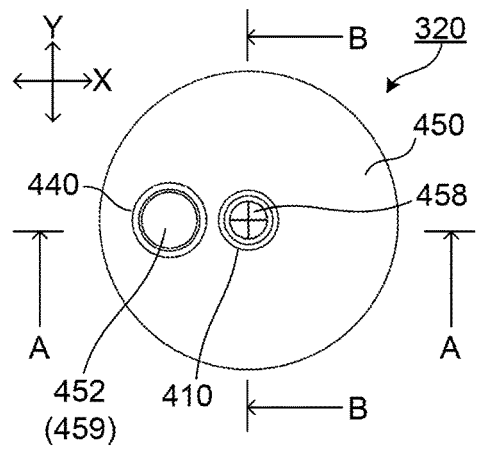
FIG. 13A is a plan view of the emitter according to the embodiment.
Figure 13D:
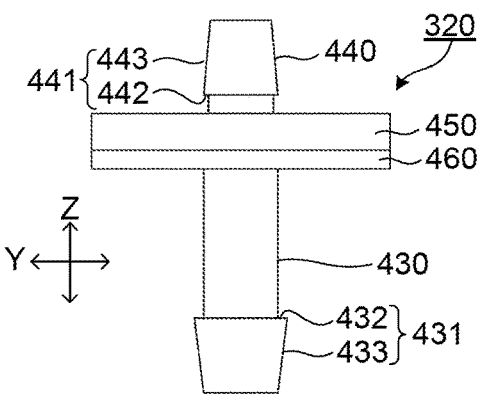
FIG. 13D is a left side view of the emitter.
Figure 13B:
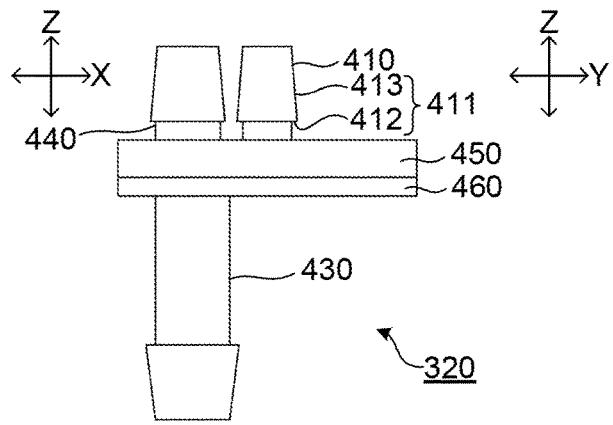
FIG. 13B is a front view of the emitter.
Figure 13E:
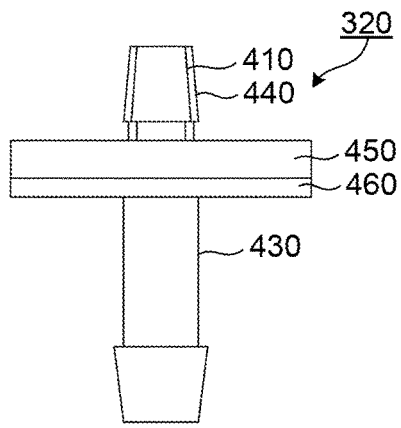
FIG. 13E is a right side view of the emitter.
Figure 13C:
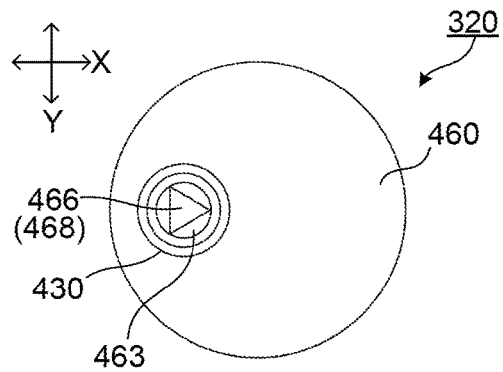
FIG. 13C is a bottom view of the emitter.

FIG. 12A is a perspective view of emitter 320 in FIG. 11 as viewed from tube 110 side, and FIG. 12B is a perspective view of emitter 320 in FIG. 11 as viewed from a side opposite to tube 110. In addition, FIG. 13A is a plan view of emitter 320, FIG. 13B is a front view of emitter 320, FIG. 13C is a bottom view of emitter 320, FIG. 13D is a left side view of emitter 320, and FIG. 13E is a right side view of emitter 320. Furthermore, FIG. 14A is a sectional view of emitter 320 taken along line A-A of FIG. 13A, and FIG. 14B is a sectional view of emitter 320 taken along line B-B of FIG. 13A.

Emitter 320 includes first cylindrical part 410, flange part 420 connected with first cylindrical part 410, second cylindrical part 430 connected with flange part 420 on a side opposite to first cylindrical part 410, and third cylindrical part 440 connected with flange part 420 on first cylindrical part 410 side. Flange part 420 is composed of a combination of first plate part 450 and second plate part 460. It is to be noted that the Z direction is a direction along the axis of first cylindrical part 410, and includes the direction along which emitter 320 is inserted to tube 110. The X direction is one direction orthogonal to the Z direction, and the Y direction is a direction orthogonal to both of the Z direction and the X direction.

As illustrated in FIG. 12A, first cylindrical part 410 is a cylindrical member uprightly provided on the surface of first plate part 450. As illustrated in FIG. 13A and FIG. 13B, first cylindrical part 410 is disposed at a center portion of flange part 420 in plan view.

Figure 14A:
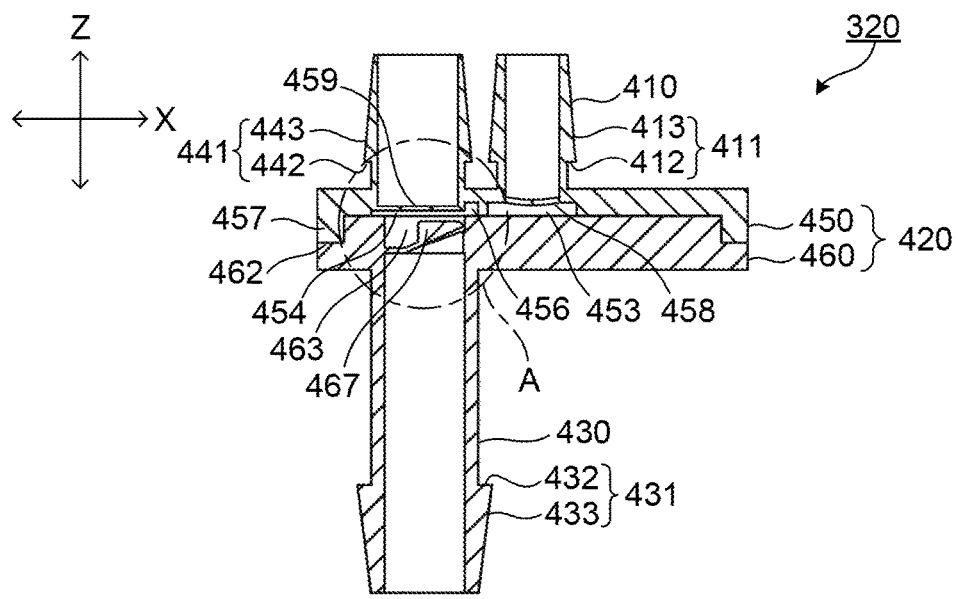
FIG. 14A is a sectional view of the emitter according to the embodiment taken along line A-A of FIG. 13A.
Figure 14B:
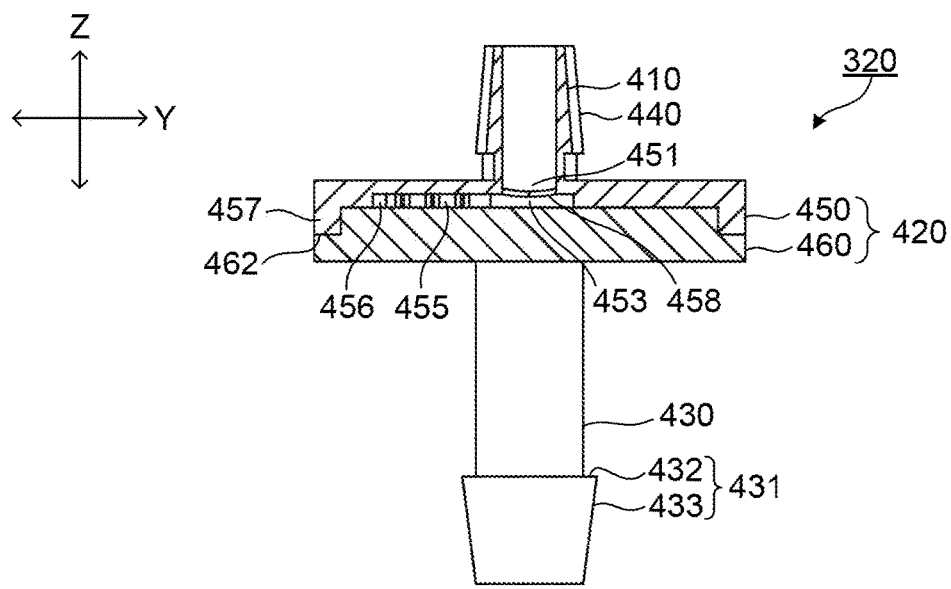
FIG. 14B is a sectional view of the emitter taken along line B-B of FIG. 13A.

As illustrated in FIG. 14A, barb 411 is formed at a tip end portion of first cylindrical part 410. Barb 411 is composed of large diameter part 412 which expands from the outer peripheral surface of first cylindrical part 410 along XY plane, and tapered surface 413 whose outer diameter gradually decreases from large diameter part 412 toward the tip end of first cylindrical part 410. For example, first cylindrical part 410 has an internal diameter of 2 mm, large diameter part 412 has an outer diameter of 3.2 mm, the tip end of tapered surface 413 has an outer diameter of 2.6 mm, and first cylindrical part 410 has a height from the surface of flange part 420 of 5 mm.

As with first cylindrical part 410, third cylindrical part 440 is a cylindrical member uprightly provided on the surface of first plate part 450 as illustrated in FIG. 12A. As illustrated in FIG. 13A and FIG. 13B, third cylindrical part 440 is disposed at a position shifted from the center of flange part 420 in the X direction.

As illustrated in FIG. 14A, barb 441 is formed at a tip end portion of third cylindrical part 440. Barb 441 is composed of large diameter part 442 which expands from the outer peripheral surface of third cylindrical part 440 along XY plane, and tapered surface 443 whose outer diameter gradually decreases from large diameter part 442 toward the tip end of third cylindrical part 440. For example, third cylindrical part 440 has an internal diameter of 3 mm, large diameter part 442 has an outer diameter of 4 mm, the tip end of tapered surface 443 has an outer diameter of 3.3 mm, and third cylindrical part 440 has a height from the surface of flange part 420 of 5 mm.

As viewed along the Z direction (as the shape in plan view), flange part 420 has a circular shape. For example, flange part 420 has a thickness of 3 mm, and flange part 420 has an outer diameter of 16 mm.

FIG. 15A is a plan view of an integrally formed member (hereinafter also referred to as "first member") of first cylindrical part 410, third cylindrical part 440 and first plate part 450, FIG. 15B is a front view of the first member, FIG. 15C is a bottom view of the first member, FIG. 15D is a left side view of the first member, and FIG. 15E is a left side view of the first member. In addition, FIG. 16 is a sectional view of the first member taken along line A-A of FIG. 15A.

Figure 16:
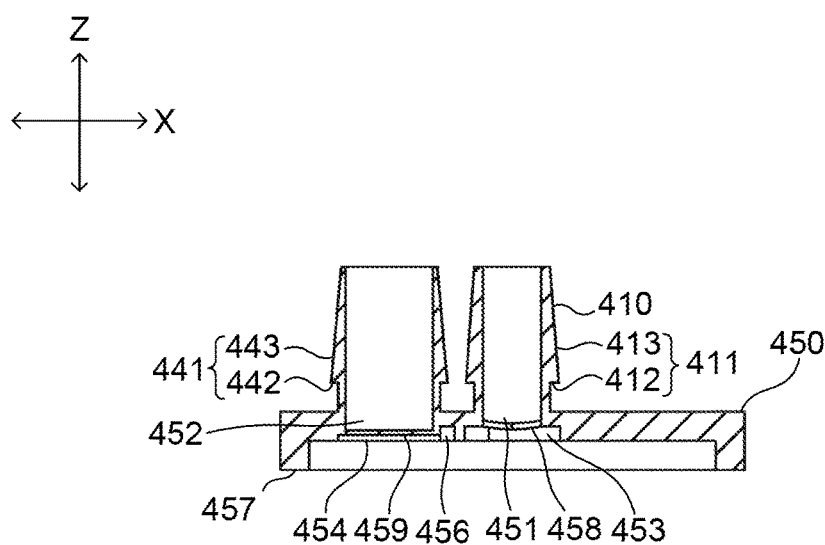
FIG. 16 is a sectional view of the first member of the embodiment taken along line A-A of FIG. 15A.

As illustrated in FIG. 14B, FIG. 15C and FIG. 16, first plate part 450 includes hole 451 and recess 452 opening at the surface, and recesses 453 and 454, grooves 455 and 456 and linear protrusion 457 formed on the bottom surface. First plate part 450 further includes flow rate regulation valve 458 which covers hole 451 at the boundary part between hole 451 and recess 453.

As illustrated in FIG. 15A and FIG. 16, hole 451 opens at a center portion of the surface of first plate part 450, and opens at recess 453 described later. In addition, the opening of hole 451 on the surface of first plate part 450 is included in first cylindrical part 410. That is, hole 451 communicates between first cylindrical part 410 and recess 453. In plan view, hole 451 has a circular shape as illustrated in FIG. 13A. The diameter of hole 451 is equal to the internal diameter of first cylindrical part 410.

As illustrated in FIG. 16, recess 452 is a recess formed on the surface of first plate part 450. In addition, the opening of recess 452 on the surface of first plate part 450 is included in third cylindrical part 440. That is, recess 452 is communicated with third cylindrical part 440. In plan view, recess 452 has a circular shape as illustrated in FIG. 13A. The bottom of recess 452 constitutes film 459 described later. The diameter of recess 452 is equal to the internal diameter of third cylindrical part 440. In addition, recess 452 has a depth from the surface of first plate part 450 of, for example, 0.65 mm.

As illustrated in FIG. 16, recess 453 is a recess formed at a center portion of the bottom surface of first plate part 450. In plan view, recess 453 has a circular shape as illustrated in FIG. 15C. The diameter of recess 453 is slightly greater than the internal diameter of first cylindrical part 410. Recess 453 has a depth from the bottom surface of first plate part 450 of, for example, 0.5 mm.

As illustrated in FIG. 15C, groove 455 is a groove formed on the bottom surface of first plate part 450 and connected with recess 453. As illustrated in FIG. 15C, groove 455 extends along the radial direction on the bottom surface of first plate part 450 from recess 453 to a peripheral portion of the bottom surface of first plate part 450. In plan view, groove 455 has a zigzag shape similar to that of the groove 232, and groove 455 has a width (in FIG. 15C W) of, for example, 0.45 mm.

As illustrated in FIG. 15C, recess 454 is a recess formed independently from recess 453 on the bottom surface of first plate part 450 at a position adjacent to recess 453 in the X direction. In plan view, recess 454 has a rectangular shape. In the Z direction, recess 454 overlaps recess 452 on the surface side of first plate part 450, and this overlapping part constitutes thin film 459. Accordingly, film 459 has a circular shape in plan view. In this manner, film 459 is disposed to face recess 454. Recess 454 has a depth from the bottom surface of first plate part 450 of, for example, 0.2 mm, and film 459 has a thickness of, for example, 0.15 mm. The thickness of film 459 is determined by a computer simulation or an experiment using a trial product or the like on the basis of the deformation amount under the pressure described later.

As illustrated in FIG. 15C, groove 456 is a groove formed on the bottom surface of first plate part 450, and connects groove 455 and recess 454. In plan view, groove 456 has an L shape, and groove 456 is connected with groove 455 at an end of the short side of the L-shape and with recess 454 at an end portion of the long side of the L-shape.

As illustrated in FIG. 15C, linear protrusion 457 is disposed at a peripheral portion of the bottom surface of first plate part 450, and as illustrated in FIG. 16, linear protrusion 457 protrudes from the bottom surface of first plate part 450. In plan view, linear protrusion 457 has a ring shape as illustrated in FIG. 15C. Linear protrusion 457 has a height from the bottom surface of first plate part 450 of, for example, 1 mm.

As with the above-described flow rate regulation valve 223, flow rate regulation valve 458 is composed of four opening-closing parts. As illustrated in FIG. 15C and FIG. 16, the opening-closing part has a form similar to the form in which a substantially hemisphere thin dome covering the opening of recess 452 side of hole 451 and protruding toward recess 453 is divided with slits in a cross shape. The slit has a width of, for example, 0 mm, and the opening-closing part has a thickness of, for example, 0.2 mm.

Figure 17A:
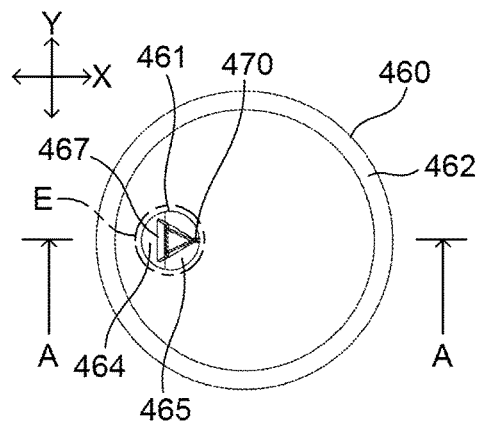
FIG. 17A is a plan view of a second member of the embodiment.
Figure 17B:
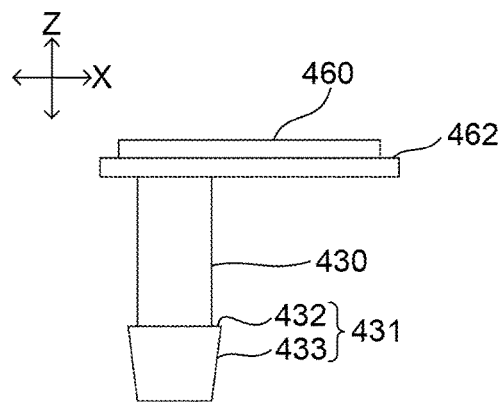
FIG. 17B is a front view of the second member.
Figure 17D:
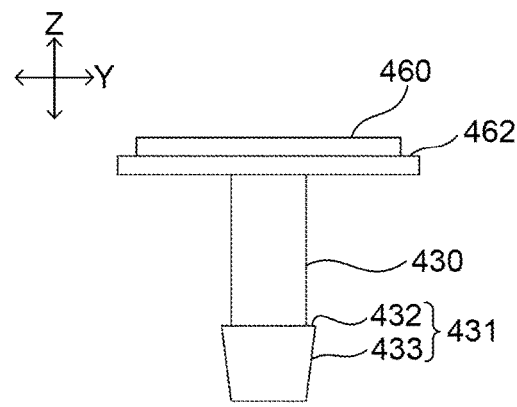
FIG. 17D is a side view of the second member, and FIG. 17E illustrate part E of FIG. 17A of the second member in an enlarged manner.
Figure 17C:
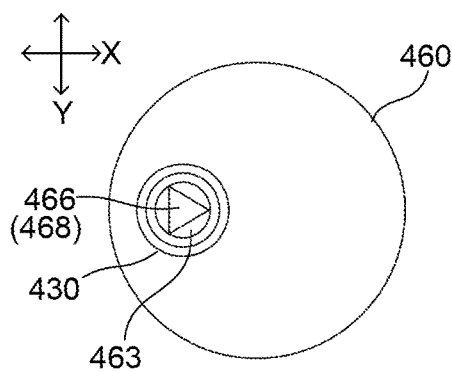
FIG. 17C is a bottom view of the second member.
Figure 17E:
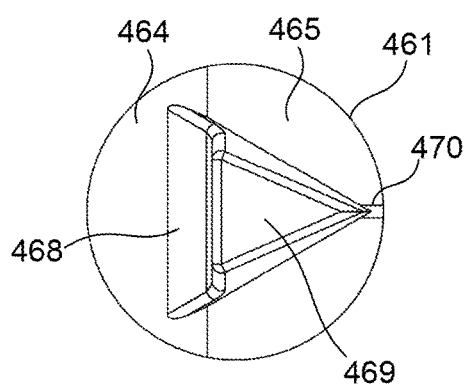

FIG. 17A is a plan view of an integrally formed member (hereinafter also referred to as "second member") of second cylindrical part 430 and second plate part 460, FIG. 17B is a front view of the second member, FIG. 17C is a bottom view of the second member, FIG. 17D is a side view of the second member, and FIG. 17E is part E of the second member in FIG. 17A in an enlarged manner. In addition, FIG. 18 is a sectional view of the second member taken along line A-A of FIG. 17A.

Figure 18:
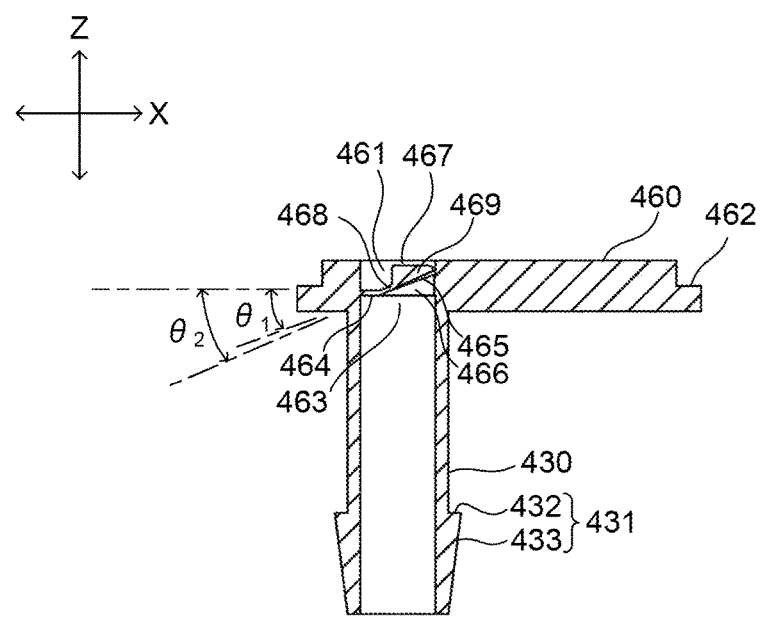
FIG. 18 is a sectional view of the second member of the embodiment taken along line A-A of FIG. 17A.

As illustrated in FIG. 18, second plate part 460 includes recess 461 and linear recess 462 formed on one surface of (first surface) and recess 463 formed on the other surface (second surface).

As illustrated in FIG. 18, recess 461 is a bottomed recess which opens at the first surface of the second plate part. In plan view, recess 461 has a circular shape. As illustrated in FIG. 18 and FIG. 17A, the bottom surface of recess 461 includes arch-shaped plane part 464 having a smaller size in plan view, and arch-shaped tilted part 465 having a greater size in plan view. Plane part 464 is a planar portion which is parallel to the first surface, and tilted part 465 is tilted from plane part 464 toward the first surface. Plane part 464 has a thickness of, for example, 0.2 mm.

As illustrated in FIG. 18, hole 466 opens at tilted part 465. As illustrated in FIG. 17C, hole 466 has a triangular shape in plan view.

As illustrated in FIG. 18, flap 467 includes flap plate 468 and protrusion 469 protruding from flap plate 468. As illustrated in FIG. 17C, in plan view, flap 467 has a triangular shape, as with hole 466 in plan view.

As illustrated in FIG. 17E and FIG. 18, flap plate 468 is composed of a thin plate part which is bent from plane part 464 with one side of the opening shape of hole 466 as a fold line part. Thus, flap 467 is formed integrally with second plate part 460 such that flap 467 is turnable about the fold line part. In this manner, the opening shape of hole 466 includes a linear part, and flap 467 includes a linear fixed end at the linear part such that flap 467 is turnable about the fixed end. It is to be noted that the fixed end in the Y direction length for example 2.5 to 3 mm. In addition, flap plate 468 has a thickness of, for example, 0.2 mm.

As illustrated in FIG. 18, flap plate 468 is further tilted than tilted part 465. For example, inclination angle $\theta_1$ between tilted part 465 and the surface of plane part 464 is 19°, inclination angle $\theta_2$ between the bottom surface of flap plate 468 and the surface of plane part 464 is 26.6°. The size of the gap between hole 466 and flap 467 is largest at a position between the apex of hole 466 and a tip end (apex) of flap 467. Thus, as viewed along an axis for the turning (in the Y direction), flap plate 468 where flap 467 makes close contact with the opening edge of hole 466 is disposed obliquely to tilted part 465 including the portions other than the linear part of the opening edge of hole 466 in a non-contact manner.

In plan view, protrusion 469 has a triangular shape and is included in the shape of flap 467 as illustrated in FIG. 17E. To be more specific, while protrusion 469 has a triangular shape in plan view, each side of protrusion 469 is composed of a tapered surface tilted from hole 466 side toward the opening part of recess 461 at each side of the triangular shape, as with Embodiment 1. Thus, the top surface of protrusion 469 has an isosceles triangular shape in plan view. As illustrated in FIG. 18, the top surface of protrusion 469 is parallel to the opening edge of recess 461. In the Z direction, the distance between the opening edge and the top surface is, for example, 0.2 mm.

As illustrated in FIG. 17A and FIG. 17E, groove 470 is a groove which is formed on the surface of tilted part 465 and is connected with hole 466 at the apex of the opening shape of hole 466. Groove 470 has a width of, for example, 0.25 mm, and groove 470 has a depth from tilted part 465 of, for example, 0.1 mm.

As illustrated in FIG. 17A, linear recess 462 is disposed at the peripheral portion of the first surface, and is depressed from the second surface as illustrated in FIG. 17B and FIG. 17D. In plan view, linear recess 462 has a ring shape as illustrated in FIG. 17A. Linear recess 462 has a depth from the second surface of, for example, 1 mm.

As illustrated in FIG. 18, recess 463 is disposed at a position where recess 463 overlaps recess 461 in the Z direction in the second surface. As is obvious from FIG. 17C and FIG. 18, recess 463 has a circular shape in plan view. Hole 466 opens at the bottom surface of recess 463. That is, recess 463 is communicated with recess 461 through hole 466.

As illustrated in FIG. 12B, second cylindrical part 430 is a cylindrical member uprightly provided on the second surface of second plate part 460. As illustrated in FIG. 13B and FIG. 13C, second cylindrical part 430 is disposed at a position shifted from the center of the planar shape of flange part 420 in the X direction on the side opposite to with respect to third cylindrical part 440 with flange part 420 therebetween. Second cylindrical part 430 includes the opening of recess 463 of the second surface. That is, second cylindrical part 430 is communicated with recess 463. The internal diameter of second cylindrical part 430 is equal to the diameter of recess 463.

As illustrated in FIG. 17B and FIG. 18, barb 431 is formed at a tip end portion of second cylindrical part 430 as with first cylindrical part 410. Barb 431 is composed of large diameter part 432 which expands from the outer peripheral surface of second cylindrical part 430 along the XY plane, and tapered surface 433 whose outer diameter gradually decreases from large diameter part 432 toward the tip end of second cylindrical part 430. For example, second cylindrical part 430 has an internal diameter of 3 mm, large diameter part 432 has an outer diameter of 5 mm, the tip end of tapered surface 433 has an outer diameter of 4 mm, and second cylindrical part 430 has a height from the second surface of second plate part 460 of 12 mm.

As with emitter main body 200 of Embodiment 1, each of the first component and the second component is integrally molded by injection molding using one resin material having flexibility (for example, polypropylene). Examples of the material of the first component and the second component include resin and rubber, and examples of the resin include polyethylene and silicone. The flexibility of the material is properly adjusted by the type of the resin material, mixture of two or more resin materials or the like in accordance with the flexibility required for film 459.

(Operation)

The first member and the second member are combined with each other by fitting linear protrusion 457 of first plate part 450 with linear recess 462 of second plate part 460, and thus emitter 320 is formed as illustrated in FIG. 12A and FIG. 12B. The bottom surface of first plate part 450 and the first surface of the second plate part may be joined by welding of a resin material, by bonding using an adhesive agent, by pressure bonding of one of them to the other or the like.

As illustrated in FIG. 14A and FIG. 14B, when the first member and the second member are combined with each other, recess 453 and grooves 455 and 456 illustrated in FIG. 15C are covered with the surface of second plate part 460, and thus the channel for irrigation liquid is formed. In addition, the intake part for receiving the irrigation liquid in tube 110 is composed with first cylindrical part 410, hole 451 and recess 453. Groove 455 constitutes the pressure reduction channel for allowing the irrigation liquid received from the intake part to flow therethrough while reducing the pressure of the irrigation liquid.

In addition, recess 454 illustrated in FIG. 15C and recess 461 illustrated in FIG. 17A are combined with each other to form a channel on the downstream side relative to the pressure reduction channel of the irrigation liquid. In addition, hole 466 faces film 459 and opens at the channel. As illustrated in FIG. 14A, film 459 is disposed at a position separated from flap 467. Flap 467 is disposed so as to form a gap between the flap 467 and at least a part of the opening edge of hole 466, and constitutes a valve element which is disposed such that it can be brought into contact with the opening edge and can be separated from the opening edge. In this manner, with the combination of recess 454 and recess 461, the flow rate controlling part for controlling the flow rate of the irrigation liquid supplied from the pressure reduction channel in accordance with the pressure of the irrigation liquid in tube 110 is formed. It is to be noted that second cylindrical part 430 is communicated with recess 461 and constitutes the discharge the discharge part which is supplied with irrigation liquid which is to be discharged out of tube 110 and has a flow rate controlled by the flow rate controlling part.

Flap 467 is disposed at a position separated from film 459 such that flap 467 can open and close hole 466. Flap 467 constitutes a valve element for opening and closing hole 466 which constitutes a channel for irrigation liquid. In addition, as described later in detail, flap plate 468 makes close contact with the opening edge of hole 466 when flap 467 is closed. In this manner, the opening edge of hole 466 constitutes a valve seat on which flap 467 sits when flap 467 closes hole 466.

As illustrated in FIG. 11, emitter 320 is attached to tube 110 by inserting first cylindrical part 410 and third cylindrical part 440 to the pipe wall of tube 110. Attaching of emitter 320 may be performed by penetrating the pipe wall of tube 110 with first cylindrical part 410 and third cylindrical part 440, or by inserting first cylindrical part 410 and third cylindrical part 440 to an opening part for insertion which is preliminarily formed on the pipe wall of tube 110. The former is favorable for arbitrarily disposing emitter 320 on tube 110, and the latter is favorable for preventing leakage of irrigation liquid from tube 110. Since each of first cylindrical part 410 and third cylindrical part 440 includes a barb at the tip end portion thereof, dropping of emitter 320 from tube 110 is prevented.

It is to be noted that second cylindrical part 430 of emitter 320 includes barb 431 as illustrated in FIG. 14A and FIG. 14B. Accordingly, barb 431 can be inserted to a mulching film covering the soil, or barb 431 can be inserted to a fibrous cultivation bed. Insertion of barb 431 to the cultivation bed is favorable for specifying the position of dropping of irrigation liquid in the cultivation bed, and for fixing trickle irrigation tube 400 to the cultivation bed.

Figure 19A:
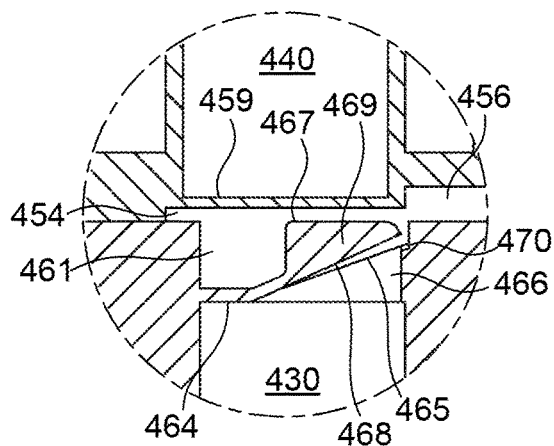
FIG. 19A illustrates part A of FIG. 14A in an enlarged manner in the case where the pressure of the irrigation liquid in the tube is equal to or higher than the first pressure value and lower than the second pressure value.
Figure 19B:
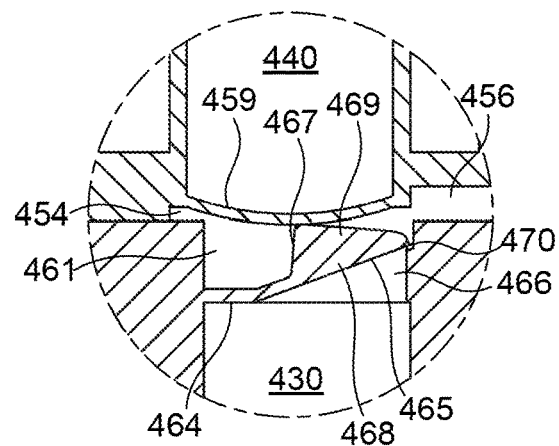
FIG. 19B illustrates part A of FIG. 14A in an enlarged manner in the case where the pressure of the irrigation liquid in the tube is equal to or higher than the second pressure value.
Figure 19C:
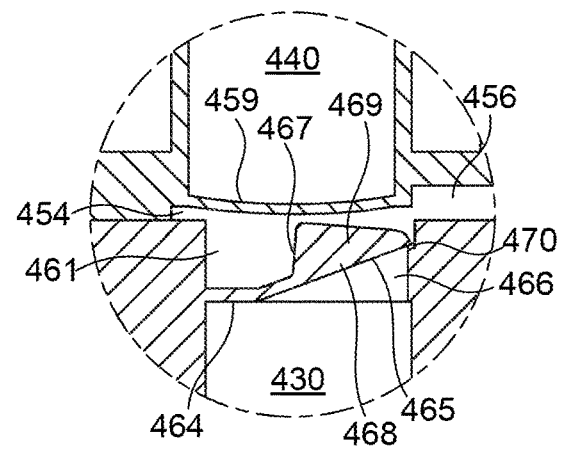
FIG. 19C illustrates part A of FIG. 14A in an enlarged manner in the case where the pressure of the irrigation liquid in the tube is reset to the pressure equal to or higher than the first pressure value and lower than the second pressure value.

Next, discharging of irrigation liquid by emitter 320 is described. FIG. 19A illustrates part A of FIG. 4B in an enlarged manner in the case where the pressure of the irrigation liquid in tube 110 is equal to or higher than the first pressure value and lower than the second pressure value, FIG. 19B illustrates part A of FIG. 4B in an enlarged manner in the case where the pressure of the irrigation liquid in tube 110 is equal to or higher than the second pressure value, and FIG. 19C illustrates part A of FIG. 4B in an enlarged manner in the case where the pressure of the irrigation liquid in tube 110 is reset to a pressure equal to or higher than the first pressure value and lower than the second pressure value.

Supply of irrigation liquid to trickle irrigation tube 400 is performed in a range where the pressure of the irrigation liquid does not exceed 0.1 MPa for example in view of preventing the damaging of tube 110 and emitter 320. When the irrigation liquid is supplied into tube 110, the irrigation liquid reaches flow rate regulation valve 458 through first cylindrical part 410.

When the pressure of the irrigation liquid in tube 110 is equal to or higher than a first pressure value (for example 0.005 MPa), flow rate regulation valve 458 is pushed toward second plate part 460, and the slit of flow rate regulation valve 458 expands. In this manner, the irrigation liquid flows into flange part 420. Flow rate regulation valve 458 suppresses inflow of irrigation liquid into flange part 420 in the case where the pressure of the irrigation liquid is lower than the first pressure value. Thus, irrigation liquid can be supplied to the tube 110 with high pressure, and therefore the configuration in which emitter 320 includes flow rate regulation valve 458 is favorable for forming trickle irrigation tube 400 having a greater length, for example.

The irrigation liquid having passed through flow rate regulation valve 458 is supplied to groove 455 (pressure reduction channel). The pressure of the irrigation liquid flowing through groove 455 is reduced as a result of pressure loss caused by the shape (zigzag shape) in plan view of groove 455. In addition, floating materials in the irrigation liquid are entangled in the turbulent flow generated between the protrusions of groove 455 and are retained in groove 455. In this manner, the floating materials are further removed from the irrigation liquid by groove 455.

In addition, since the tip of the protrusion is disposed such that the tip of the protrusion does not exceed the center line of groove 455 in plan view, a space which is not blocked by the protrusion is formed at the center of groove 455 while the width of the space is small, and thus the irrigation liquid easily flow through groove 455. Accordingly, in addition to the effect of reducing pressure and the effect of removing the floating material, groove 455 is favorable for allowing irrigation liquid to flow with a greater flow rate.

The irrigation liquid having passed through groove 455 in which the pressure is reduced and the floating materials are removed is supplied into recess 261 through groove 456. The space of recess 454 and recess 461 facing film 459 is filled with the irrigation liquid, and the irrigation liquid is supplied to hole 466 (FIG. 19A).

The irrigation liquid having passed through hole 466 reaches second cylindrical part 430 through recess 463, and is discharged out of tube 110 through second cylindrical part 430.

As the pressure of the irrigation liquid in tube 110 increases, the flow rate of the irrigation liquid to be received by emitter 320 from first cylindrical part 410 increases, and consequently the discharge rate of the irrigation liquid from second cylindrical part 430 increases.

When the pressure of the irrigation liquid in tube 110 is equal to or higher than the second pressure value (for example, 0.02 MPa), film 459 is pushed and is bent by the irrigation liquid introduced into from third cylindrical part 440 from the inside of tube 110 as illustrated in FIG. 19B. Thus, the pressure of the irrigation liquid in tube 110 is transmitted to the rear surface of film 459. As a result, film 459 makes contact with protrusion 469 of flap 467, and pushes flap 467.

Flap 467 and hole 466 have the same triangular shape in plan view, and the bottom surface of flap plate 468 is slightly (by an angle obtained by subtracting $\theta_1$ from $\theta_2$) tilted with respect to the opening edge of hole 466 (tilted part 465). Accordingly, since one side of the triangular shape is the fixed end, the distance from the fixed end to the two sides of flap plate 468 along the bottom surface of flap plate 468 is greater than the distance from the fixed end to the two sides of hole 466 along inclined surface 465. Thus, flap plate 468 covers the opening part of hole 466, and the peripheral portion of flap plate 468 of flap 467 serving as the valve element makes close contact with (sits on) the opening edge of hole 466 serving as a valve seat. In this manner, flap 467 functions as the valve element which seals hole 466 serving as channel for irrigation liquid, and the opening edge of hole 466 function as the valve seat on which the valve element sits.

However, since groove 470 is formed on the surface of the opening edge of hole 466 serving as the valve seat, groove 470 communicates between the inside of recess 461 as the channel on the upstream side relative to the valve seat of irrigation liquid and hole 466 as the channel is the downstream side of the valve seat when flap 467 serving as the valve element sits on the valve seat. Thus, the irrigation liquid supplied to recess 461 is supplied to hole 466 through groove 470.

Consequently, the amount of the irrigation liquid which passes through the flow rate control part is restricted to a flow rate which can pass through groove 470, and the discharge rate of the irrigation liquid from second cylindrical part 430 becomes substantially constant. In this manner, emitter 320 quantitatively discharges the irrigation liquid from tube 110 supplied with the irrigation liquid.

When hole 466 is closed by flap 467, the pressure in recess 461 is normally relatively higher than the pressure in hole 466. Accordingly, as illustrated in FIG. 19C, even when the pressure of the irrigation liquid in tube 110 is reduced to a pressure lower than the second pressure value, a pressure difference obtained by subtracting the inner pressure of 466 from the inner pressure of recess 461 is a positive pressure, and in addition, in the case where the inner pressure of recess 461 is greater than the elastic force of returning to the initial position of flap 467, flap 467 keeps closing hole 466 even when the pressure of the irrigation liquid in tube 110 is once increased to the second pressure value and thereafter reduced to a value lower than the second pressure value. Thus, the amount of the irrigation liquid passing through the flow rate controlling part is continuously restricted to the flow rates which can pass through groove 470.

When the irrigation liquid in recess 461 sufficiently flows through groove 470, the inner pressure of recess 461 is sufficiently reduced. Then, when the pressure difference is reduced to a value smaller than the elastic force, flap 467 returns to the initial position with the elastic force, and hole 466 is opened as illustrated in FIG. 19A. Then, the irrigation liquid in recess 461 again flows to hole 466 through the gap between flap 467 and the opening part of hole 466.

(Effect)

As described, emitter 320 is an emitter for quantitatively discharging irrigation liquid in tube 110 to outside of tube 110, tube 110 being configured for allowing the irrigation liquid to flow therethrough, emitter 320 being to be disposed on tube 110 and including: the intake part for receiving the irrigation liquid in tube 110; the pressure reduction channel for allowing the irrigation liquid received from the intake part to flow therethrough while reducing a pressure of the irrigation liquid; the flow rate controlling part for controlling a flow rate of the irrigation liquid supplied from the pressure reduction channel in accordance with a pressure of the irrigation liquid in tube 110 or in the intake part; and the discharge part which is supplied with the irrigation liquid which has a flow rate controlled by the flow rate controlling part and is to be discharged to the outside of tube 110; the flow rate controlling part including: the valve element for opening and closing a channel of the irrigation liquid, the valve seat on which the valve element sits when the valve element closes the channel of the irrigation liquid, film 459 for pushing the valve element toward the valve seat by being bent under the pressure of the irrigation liquid in tube 110 or in the intake part such that the valve element sits on the valve seat, and groove 470 formed on a surface of the valve seat, and configured to communicate between the channel of the irrigation liquid on an upstream side of the valve seat and the channel of the irrigation liquid on a downstream side of the valve seat when the valve element sits on the valve seat. Then, when the pressure of the irrigation liquid in tube 110 is equal to or higher than a predetermined value, film 459 pushes the valve element to sit the valve element on the valve seat. Thus, emitter 320 can stabilize the discharge rate of the irrigation liquid. Further, emitter 320 can be formed with two injection-molded articles. Therefore, emitter 320 can further reduce manufacturing cost in comparison with conventional emitters composed of three parts.

In addition, Emitter 320 includes: first cylindrical part 410 constituting the intake part, flange part 420 constituting the pressure reduction channel and the flow rate controlling part, flange part 420 being connected with one end of first cylindrical part 410 and extending outward from the one end of first cylindrical part 410, and second cylindrical part 430 constituting the discharge part, the second cylindrical part 430 being connected on a side opposite to first cylindrical part 410 of flange part 420; emitter 320 is disposed on the tube by inserting first cylindrical part 410 into the tube from outside of the tube; flange part 420 is composed of a combination of first plate part 450 connected with first cylindrical part 410 and second plate part 460 connected with the second cylindrical part 430; first plate part 450 includes film 459 which is disposed to face a channel of the irrigation liquid on a downstream side of the pressure reduction channel and has a rear surface to which the pressure of the irrigation liquid in the tube or in first cylindrical part 410 is transmitted; second plate part 460 includes: the channel on the downstream side of the pressure reduction channel, hole 466 opening at the channel on the downstream side of the pressure reduction channel to face film 459, hole 466 being communicated with the discharge part, the valve element disposed such that the valve element: forms a gap between the valve element and at least a part of an opening edge of the hole; is allowed to make contact with the opening edge; and, is allowed to be separated from the opening edge; and at least a part of the opening edge of hole 466 constitutes the valve seat. This configuration is further effective from the viewpoint of forming an emitter to be disposed on the outside of tube 110 which can achieve the above-mentioned effects.

In addition, an opening shape of hole 466 includes a linear part; the valve element includes a linear fixed end at the linear part, and is turnable about the fixed end as a turning axis; the valve element has a shape identical to a shape of hole 466 as viewed along an axis direction (Z direction) of hole 466; and a portion where the valve element makes close contact with the valve seat is disposed obliquely to other portion of the opening edge of hole 466 other than the linear part without making contact with the other portion as viewed along an axis for the turning (in Y direction). This configuration makes it possible to form the flow rate controlling part which operates as described above with one component by injection molding, and is therefore further effective from the view point of reducing manufacture cost.

In addition, film 459 is disposed independently from first cylindrical part 410, and emitter 320 further includes third cylindrical part 440 which surrounds film 459 and is to be inserted into tube 110 on first cylindrical part 410 side of first plate part 450. In addition, emitter 320 is disposed to tube 110 by inserting first cylindrical part 410 and third cylindrical part 440 into tube 110 from the outside of tube 110. This configuration makes it possible to form a structure in emitter 320 for transmitting the pressure of the irrigation liquid in tube 110 to film 459 with one component by injection molding including film 459, and is therefore further effective from the view point of reducing manufacture cost.

In addition, with the configuration in which the intake part further includes flow rate regulation valve 458 for expanding the channel for the irrigation liquid when the pressure of the irrigation liquid in tube 110 is equal to or higher than a predetermined value, the irrigation liquid can be supplied to tube 110 with a higher pressure, and therefore the configuration is favorable from the standpoint of forming trickle irrigation tube 400 having a greater length.

In addition, with the configuration in which emitter 320 is molded with one material having flexibility and film 459 is integrally molded as a part of emitter 320, emitter 320 can be produced as one component by injection molding, and therefore the configuration is further effective from the standpoint of reducing manufacturing cost.

In addition, the configuration in which hole 466 is opened and closed with flap 467 which opens and closes about the fixed end is favorable for increasing the maximum size of the gap between flap 467 (valve element) and hole 466. This configuration is further effective from the view point of suppressing the clogging of the above-mentioned gap. In addition, a channel having a greater size of irrigation liquid and extending to hole 466 is formed with opened flap 467, and thus the irrigation liquid in recess 461 easily flows to hole 466. Therefore, the configuration is further effective from the view point of increasing the discharge rate of the irrigation liquid, and from the view point of increasing the variation of the flow rate of the irrigation liquid with the opening and closing of flap 467.

In addition, once flap 467 is closed, flap 467 is kept closed until the pressure difference obtained by subtracting the inner pressure of hole 466 from the inner pressure of recess 461 is sufficiently reduced (to a value smaller than the above-described elastic force). Accordingly, when the flow rate of the irrigation liquid in the case where the irrigation liquid flows only through groove 470 is set to a predetermined discharge rate of emitter 320, the flow rate of the irrigation liquid significantly varies depending on the opening and closing of flap 467 as described above, and thus the discharge rate of emitter 320 quickly returns to the above-mentioned predetermined discharge rate, which is further effective from the viewpoint of quickly achieving the predetermined discharge rate, and from the viewpoint of maintaining the rate for a long period of time.

In addition, since the configuration in which the turning axis of flap 467 has a linear shape is favorable for performing the opening and closing of flap 467 (turning) with a smaller force, the configuration is further effective from the viewpoint of precisely setting the predetermined discharge rate of the irrigation liquid in emitter 320.

In addition, since the configuration in which each of hole 466 and flap 467 has a triangular shape in plan view is favorable for reducing the contact length of the valve element and the valve seat, the configuration is further effective from the viewpoint of preventing displacement of flap 467 when flap 467 seals hole 466.

When first cylindrical part 410 and third cylindrical part 440 is inserted into tube 110 from the external side of tube 110, trickle irrigation tube 400 including tube 110 and emitter 320 disposed to tube 110 is provided. Since trickle irrigation tube 400 can quickly achieve a predetermined discharge rate and maintain the rate for a long period of time, irrigation liquid can be discharged substantially at the predetermined discharge rate at all times. Accordingly, trickle irrigation tube 400 is favorably used for growing of plants which requires further precise discharge of irrigation liquid, for example.

(Modification)

In trickle irrigation tube 400, the above-described configurations may be partially changed, or other configurations may be additionally provided as long as the above-described effect is achieved.

Figure 20A:
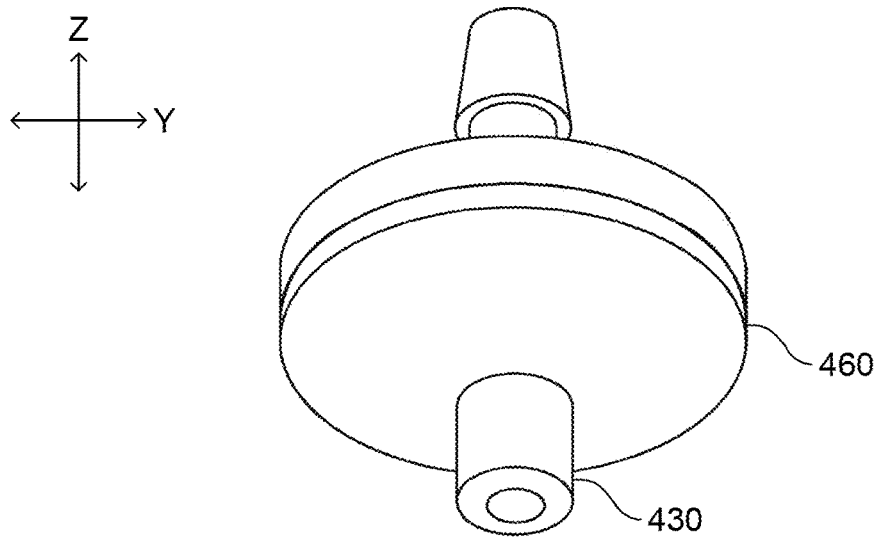
FIG. 20A schematically illustrates a first modification of a discharge part of the emitter according to the embodiment, FIG. 20B schematically illustrates a second modification of the discharge part.
Figure 20B:
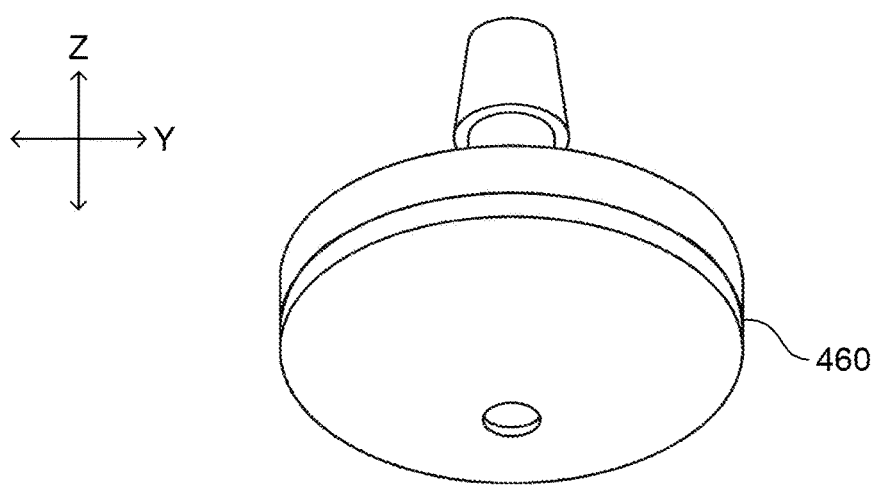
FIG. 20C illustrates a cross-section of a main part of the emitter of a modification.

For example, second cylindrical part 430 may not have barb 431 as illustrated in FIG. 20A, and may be an opening part which opens at the second surface of second plate part 460 as illustrated in FIG. 20B.

In addition, tube 110 may be a seamless tube, a tube composed of slender sheet(s) joined together along the longitudinal direction, or a tube having a gap formed at the above-mentioned joining part of the sheets so as to connect the inside and the outside of tube 110, or a pipe sandwiched by the sheets at the joining part.

In addition, the first component and the second component may be integrally formed so as to be turnable about a hinge part integrally formed with the first component and the second component. In this case, the number of components of emitter 320 can be further reduced, that is, emitter 320 can be produced with one component.

While flap 467 includes protrusion 469 having a substantially triangular pyramidal trapezoidal shape with a regular triangular bottom surface and an isosceles triangular top surface, flap 467 may not be provided with protrusion 469 as long as bending of film 459 in accordance with a predetermined value of the pressure of the irrigation liquid in tube 110 is transmitted. For example, flap 467 may include an end portion of flap 467 film 459 toward protrude rod-shaped protrusion in place of the above-mentioned shape protrusion 469. Alternatively, flap 467 may be provided with the above-mentioned rod-shaped protrusion for film 459 to push flap 467 without being provided with protrusion 469.

Figure 20C:
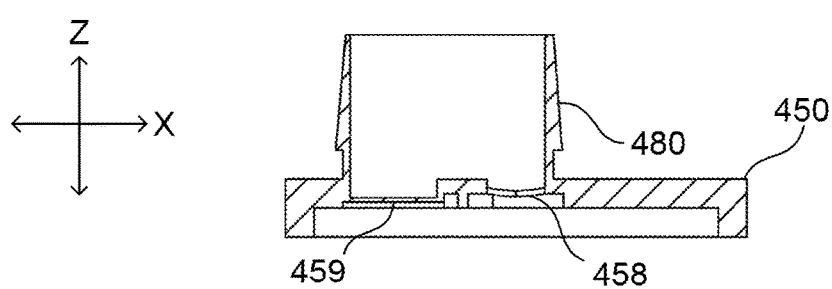

In addition, emitter 320 may include, in place of third cylindrical part 440, a part for transmitting to film 770 bending of film 459 in accordance with the pressure of the irrigation liquid in tube 110, or, a part capable of directly or indirectly transmitting to the rear surface of film 459 the pressure of the irrigation liquid in the tube. For example, as illustrated in FIG. 20C, emitter 320 may include, instead of first cylindrical part 410 and third cylindrical part 440, cylindrical part 480 which includes the openings of the hole and the recess on the surface of first plate part 450.

Figure 21A:
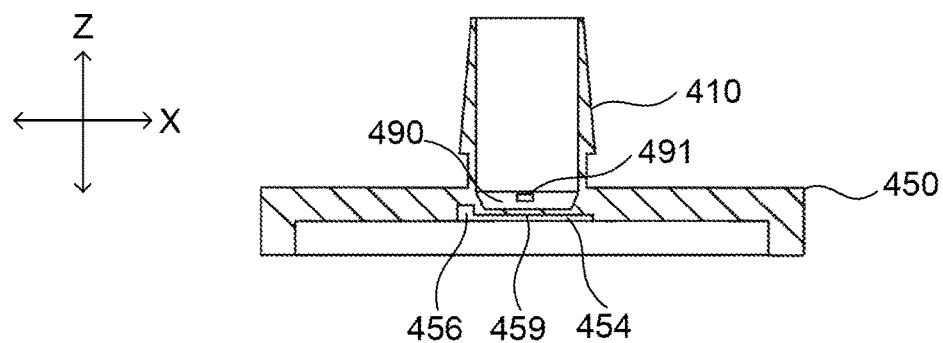
FIG. 21A illustrates a cross-section along the X direction of an emitter according to another modification of the embodiment.
Figure 21B:
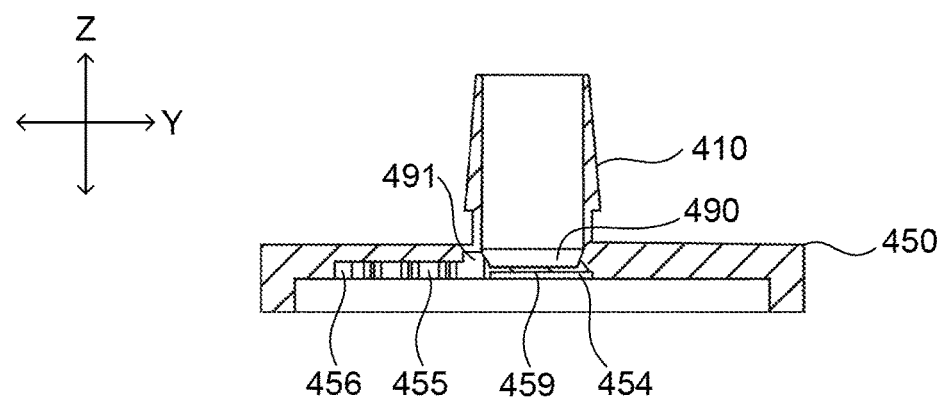
FIG. 21B illustrates a cross-section of the emitter along the Y direction.

Further, the first member of emitter 320 may not be provided with flow rate regulation valve 458. For example, as illustrated in FIG. 21A and FIG. 21B, the first member may not be provided with flow rate regulation valve 458 and third cylindrical part 440, tapered hole 490 which is coupled with first cylindrical part 410, and opening part 491 which opens at the tapered surface of tapered hole 490 and communicates between tapered hole 490 and groove 455. The irrigation liquid received by first cylindrical part 410, while the irrigation liquid transmits pressure to film 459, reaches the pressure reduction channel of groove 455 through opening part 491, and further, reaches the flow rate regulating part through the channel of groove 456. The flow rate regulating part having the emitter having the above-mentioned structure operates in accordance with the pressure of the irrigation liquid received by the intake part. Thus, the emitter achieves effects of the present embodiment other than effects of flow rate regulation valve 458.

This application is entitled to and claims the benefit of Japanese Patent Application No. 2013-272393 filed on Dec. 27, 2013, the disclosure each of which including the specification, drawings and abstract is incorporated herein by reference in its entirety.

INDUSTRIAL APPLICABILITY

According to the present invention, an emitter which can discharge liquid with an appropriate speed by the pressure of the liquid to be discharged can be easily provided. Accordingly, popularization of the above-mentioned emitter in technical fields of trickle irrigations, endurance tests and the like where long-term discharging is required, and further development of the technical fields can be expected.

REFERENCE SIGNS LIST 100, 400 Trickle irrigation tube
110 Tube
120, 320 Emitter
130 Discharge port
200 Emitter main body
201 First surface
202 Second surface
211, 212, 242, 251, 252, 253, 452, 453, 454, 461, 463 Recess
213, 214, 254, 457 Linear protrusion
221 Intake channel
223, 458 Flow rate regulation valve
231, 232, 233, 241, 245, 455, 456, 470 Groove
234, 243, 451, 466 Hole
244, 467 Flap
246, 464 Plane part
247, 465 Tilted part
248, 468 Flap plate
249, 469 Protrusion
300, 459 Film
301 Hinge part
302, 491 Opening part
410 First cylindrical part
411, 431, 441 Barb
412, 432, 442 Large diameter part
413, 433, 443 Tapered surface
420 Flange part
430 Second cylindrical part
440 Third cylindrical part
450 First plate part
460 Second plate part
462 Linear Recess
480 Cylindrical part
490 Tapered hole

The invention claimed is:

1. An emitter for quantitatively discharging irrigation liquid in a tube to outside of the tube, the tube being configured for allowing the irrigation liquid to flow therethrough, the emitter being configured to be disposed on the tube, the emitter comprising:

an intake part for receiving the irrigation liquid in the tube;

a pressure reduction channel for allowing the irrigation liquid received from the intake part to flow therethrough while reducing a pressure of the irrigation liquid;

a flow rate controlling part for controlling a flow rate of the irrigation liquid supplied from the pressure reduction channel in accordance with a pressure of the irrigation liquid in the tube or in the intake part; and a discharge part which is supplied with the irrigation liquid which has a flow rate controlled by the flow rate controlling part and is to be discharged to the outside of the tube;

wherein the flow rate controlling part includes:

a valve element for opening and closing a channel of the irrigation liquid, a valve seat on which the valve element sits when the valve element closes the channel of the irrigation liquid, a film which is disposed above the valve element such that the film is separated from the valve element when the pressure of the irrigation liquid is not exerted on the film, and the film is configured to make contact with the valve element to push the valve element toward the valve seat when bent under the pressure of the irrigation liquid in the tube or in the intake part such that the valve element sits on the valve seat, and a groove formed on a surface of the valve seat, and configured to communicate between the channel of the irrigation liquid on an upstream side of the valve seat and the channel of the irrigation liquid on a downstream side of the valve seat when the valve element sits on the valve seat, wherein:

the film pushes the valve element such that the valve element sits on the valve seat when the pressure of the irrigation liquid in the tube is equal to or higher than a predetermined value.

2. The emitter according to claim 1, wherein the intake part further includes a flow rate regulation valve configured to expand the channel of the irrigation liquid when the pressure of the irrigation liquid in the tube is equal to or higher than a predetermined value.

3. The emitter according to claim 1, wherein:

the emitter is an emitter for quantitatively discharging the irrigation liquid in the tube from a discharge port, the emitter being configured to be joined to an inner wall surface of the tube at a position corresponding to the discharge port configured to communicate between inside and outside of the tube;

the flow rate controlling part includes:
an opening part for forming a part of a channel of the irrigation liquid on a downstream side of the pressure reduction channel in the emitter, the opening part opening at a surface of the emitter at a position where the surface of the emitter is not joined to the inner wall surface, the film configured to seal the opening part and block communication between the channel on the downstream side of the pressure reduction channel and the inside of the tube, a hole opening at the channel on the downstream side of the pressure reduction channel to face the film, the hole being communicated with the discharge part, and the valve element disposed such that the valve element: forms a gap between the valve element and at least a part of an opening edge of the hole; is allowed to make contact with the opening edge; and, is allowed to be separated from the opening edge; and at least the part of the opening edge of the hole constitutes the valve seat.

4. The emitter according to claim 3, wherein:
an opening shape of the hole includes a linear part;
the valve element includes a linear fixed end at the linear part, and is turnable about the fixed end as a turning axis;
the valve element has a shape identical to a shape of the hole as viewed along an axis direction of the hole; and
a portion where the valve element makes close contact with the valve seat is disposed obliquely to other portion of the opening edge of the hole other than the linear part without making contact with the other portion as viewed along the turning axis.

5. The emitter according to claim 3, wherein:
the emitter is molded with one material having flexibility; and
the film is integrally molded as a part of the emitter.

6. The emitter according to claim 1, wherein:
the emitter comprises:
a first cylindrical part constituting the intake part;
a flange part including the pressure reduction channel and the flow rate controlling part, the flange part being connected with one end of the first cylindrical part and extending outward from the one end of the first cylindrical part; and
a second cylindrical part constituting the discharge part, the second cylindrical part being connected on a side opposite to the first cylindrical part of the flange part;

the emitter is disposed on the tube by inserting the first cylindrical part into the tube from outside of the tube;
the flange part is composed of a combination of a first plate part connected with the first cylindrical part and a second plate part connected with the second cylindrical part;
the first plate part includes the film which is disposed to face a channel of the irrigation liquid on a downstream side of the pressure reduction channel and has a rear surface to which the pressure of the irrigation liquid in the tube or in the first cylindrical part is transmitted;
the second plate part includes:
the channel on the downstream side of the pressure reduction channel,
a hole opening at the channel on the downstream side of the pressure reduction channel to face the film, the hole being communicated with the discharge part,
the valve element disposed such that the valve element: forms a gap between the valve element and at least a part of an opening edge of the hole; is allowed to make contact with the opening edge; and, is allowed to be separated from the opening edge; and
at least the part of the opening edge of the hole constitutes the valve seat.

7. The emitter according to claim 6, wherein:
the film is independently disposed at a position separated from the first cylindrical part;
the emitter further comprises a third cylindrical part to be inserted into the tube, the third cylindrical part being disposed with the first cylindrical part side by side on the first plate part at a position where the third cylindrical part surrounds the film; and
the emitter is disposed on the tube by inserting the first cylindrical part and the third cylindrical part into the tube from the outside of the tube.

8. The emitter according to claim 6, wherein:
an opening shape of the hole includes a linear part;
the valve element includes a linear fixed end at the linear part, and is turnable about the fixed end as a turning axis;
the valve element has a shape identical to a shape of the hole as viewed along an axis direction of the hole; and
a portion where the valve element makes close contact with the valve seat is disposed obliquely to other portion of the opening edge of the hole other than the linear part without making contact with the other portion as viewed along the turning axis.

9. The emitter according to claim 6, wherein:
the emitter is molded with one material having flexibility; and
the film is integrally molded as a part of the emitter.

10. A trickle irrigation tube comprising:
a tube; and
at least one emitter, the emitter being the emitter according to claim 6 disposed on the tube.

11. A trickle irrigation tube comprising:
a tube; and
at least one emitter, the emitter being the emitter according to claim 1 disposed on the tube.

* * * * *